US011130574B2

(12) United States Patent
DeVerter et al.

(10) Patent No.: US 11,130,574 B2
(45) Date of Patent: Sep. 28, 2021

(54) AIRCRAFT CARGO RESTRAINT SYSTEM AND METHOD FOR RESTRAINING CARGO WITHIN AN AIRCRAFT

(71) Applicant: The Boeing Company, Chicago, IL (US)

(72) Inventors: Trent DeVerter, Lynnwood, WA (US); William R. Clos, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 16/271,998

(22) Filed: Feb. 11, 2019

(65) Prior Publication Data

US 2020/0255149 A1    Aug. 13, 2020

(51) Int. Cl.
*B64D 9/00* (2006.01)

(52) U.S. Cl.
CPC ................... *B64D 9/003* (2013.01)

(58) Field of Classification Search
CPC .................................................. B64D 9/003
USPC ......................................... 410/96; 244/118.1
See application file for complete search history.

(56) References Cited

U.S. PATENT DOCUMENTS

| | | | |
|---|---|---|---|
| 4,395,172 A | 7/1983 | Hoener et al. | |
| 5,310,297 A | 5/1994 | Benjamin | |
| 6,105,653 A * | 8/2000 | Armstrong | ......... B60H 1/00592 160/120 |
| 7,140,823 B2 * | 11/2006 | Ackerman | ............... B64D 9/00 410/118 |
| 8,668,417 B2 | 3/2014 | Harrigan et al. | |
| 2002/0113450 A1 * | 8/2002 | De Gaillard | ............ B60R 5/047 296/24.43 |
| 2004/0066052 A1 * | 4/2004 | Payne | .................... B60P 7/0876 296/32 |
| 2008/0088145 A1 * | 4/2008 | Schlecht | ................. B60R 5/047 296/1.07 |
| 2018/0319344 A1 * | 11/2018 | Fleischhacker | ......... B60R 5/047 |

FOREIGN PATENT DOCUMENTS

| | | | | |
|---|---|---|---|---|
| CN | 205344727 U | * | 6/2016 | |
| CN | 209194590 U | * | 8/2019 | |
| DE | 1964772 A1 | * | 7/1971 | ............ B60P 7/0876 |
| DE | 19722501 A1 | * | 12/1997 | ............... B60R 5/04 |
| DE | 202005004861 U1 | * | 7/2005 | ............ B60P 7/0876 |
| DE | 102004057112 A1 | * | 6/2006 | ............ B60P 7/0876 |
| DE | 102010012315 A1 | * | 10/2010 | ............ B60P 7/0876 |
| DE | 202013001149 U1 | * | 3/2013 | ............ B60P 7/0876 |
| DE | 102012011229 A1 | * | 12/2013 | ............. B60R 21/06 |

(Continued)

OTHER PUBLICATIONS

Machine translation from espacenet of DE 501 (Year: 1997).*
Machine translation from espacenet of DE 861 (Year: 2005).*
Machine translation from espacenet of JPH 763 (Year: 1997).*

*Primary Examiner* — Hilary L Gutman
(74) *Attorney, Agent, or Firm* — Walters & Wasylyna LLC

(57) ABSTRACT

An aircraft cargo restraint system includes a fuselage framework defining a cargo cabin, a webbing configured to restrain cargo positionable within the cargo cabin, one or more spring tension reels configured to bias the webbing towards a top of the cargo cabin, and one or more actuators configured to move the webbing toward a bottom of the cargo cabin against the bias of the one or more spring tension reels.

20 Claims, 17 Drawing Sheets

(56) References Cited

FOREIGN PATENT DOCUMENTS

| EP | 2433834 A1 | * | 3/2012 | ............ B60P 7/0876 |
|---|---|---|---|---|
| FR | 2792267 A1 | * | 10/2000 | ............ B60P 7/0876 |
| FR | 2907398 A1 | * | 4/2008 | ............. B60R 7/005 |
| JP | S6365538 U | * | 4/1988 | |
| JP | S6393235 U | * | 6/1988 | |
| JP | H0924763 A | * | 1/1997 | |
| JP | 2002120642 A | * | 4/2002 | |
| WO | WO-02066286 A1 | * | 8/2002 | ............ B60P 7/0876 |
| WO | WO-2017067875 A1 | * | 4/2017 | ............... B60R 5/00 |

* cited by examiner

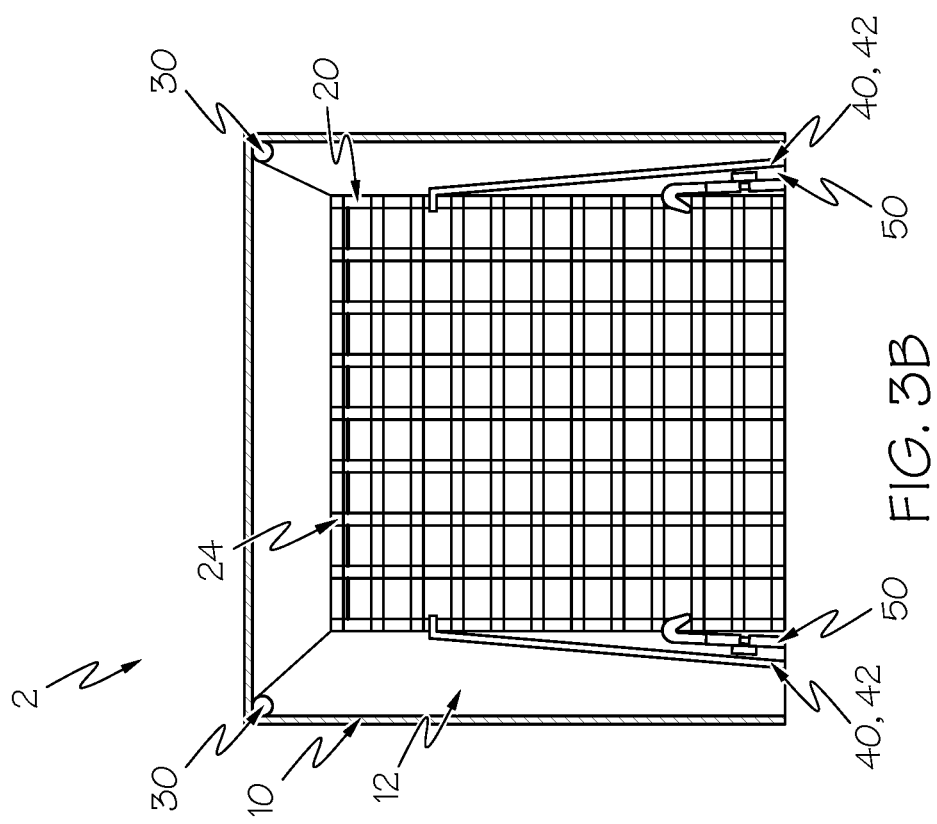
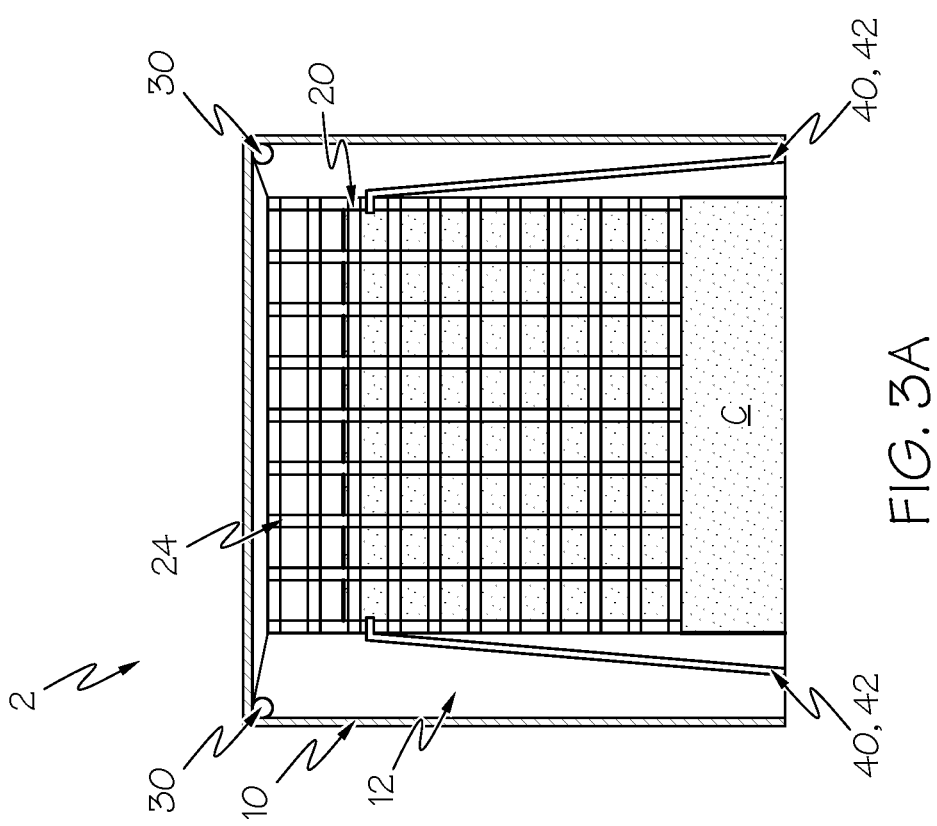

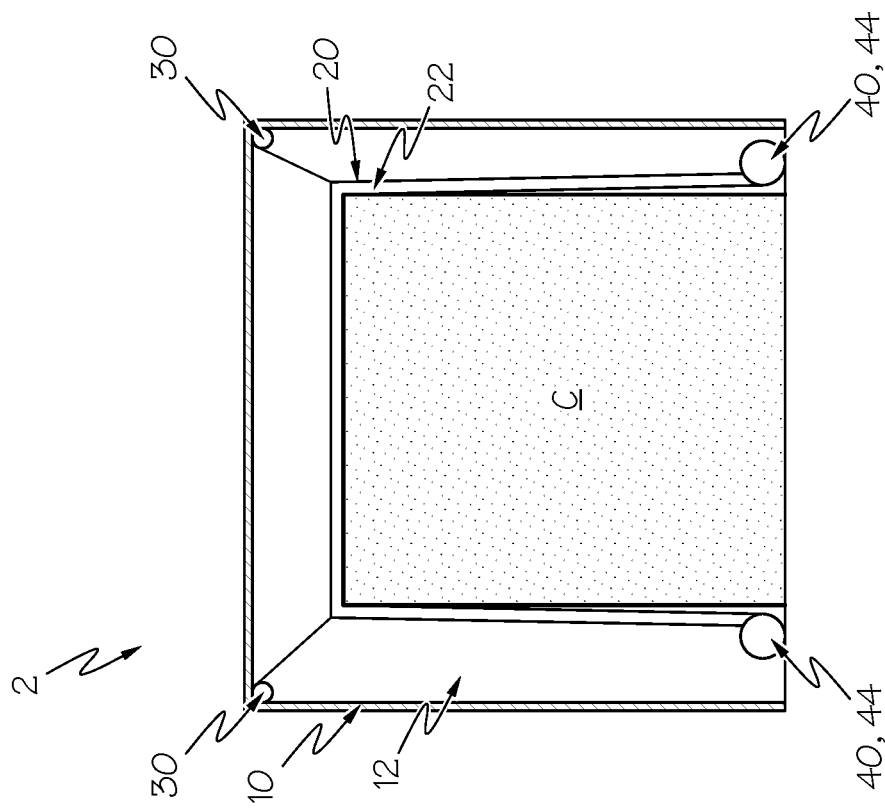
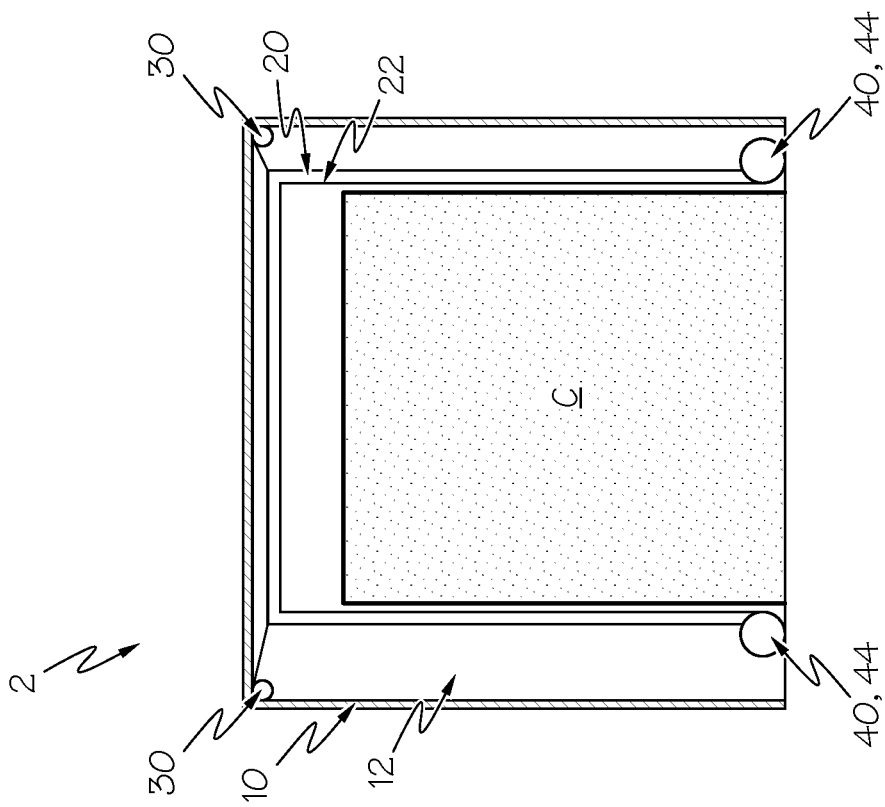

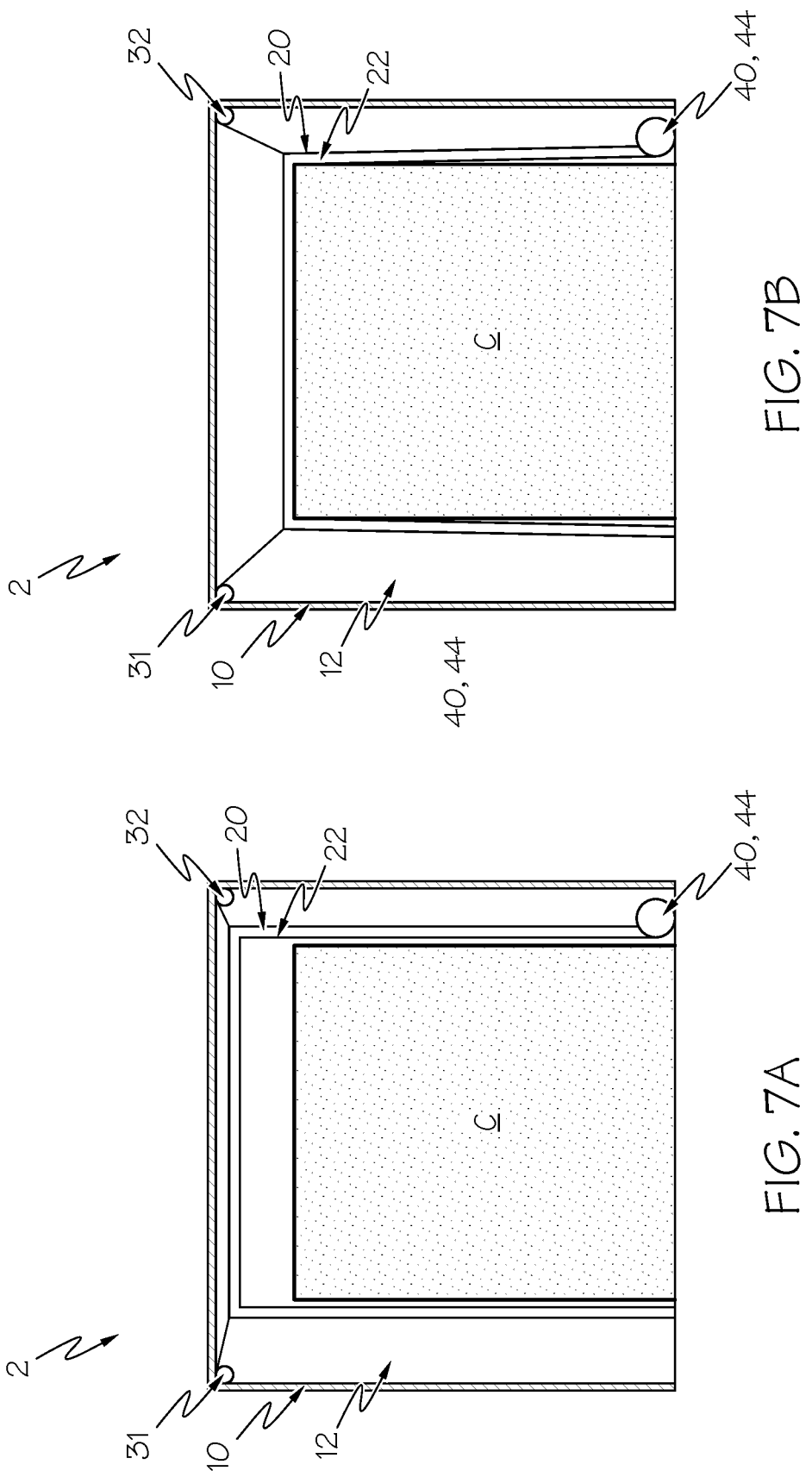

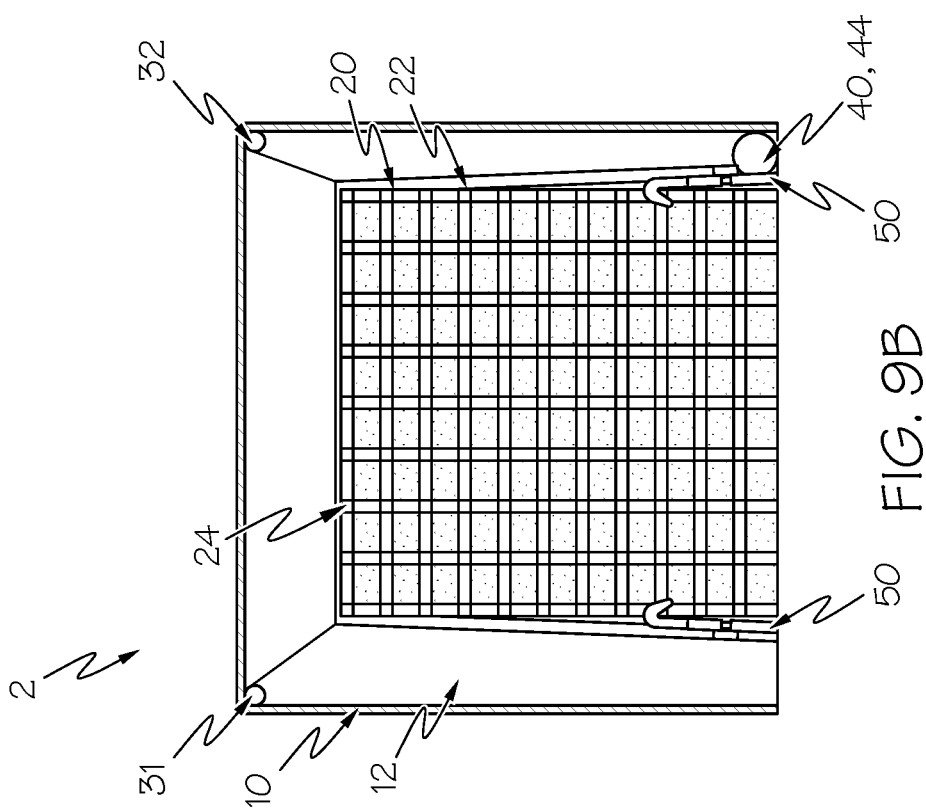
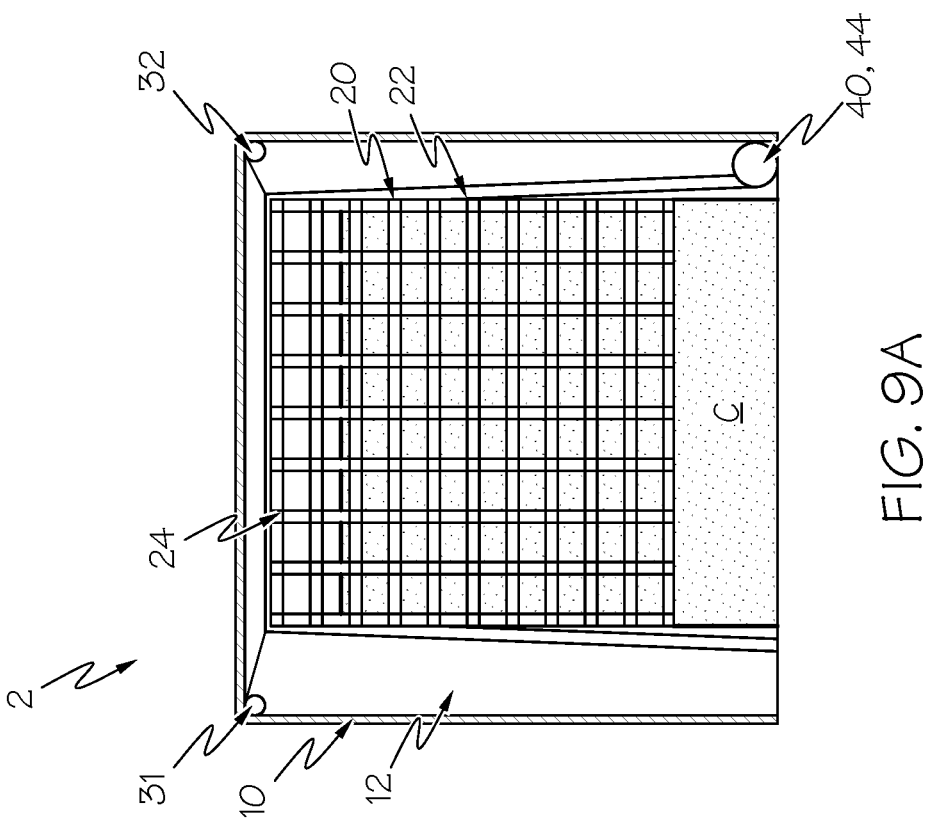

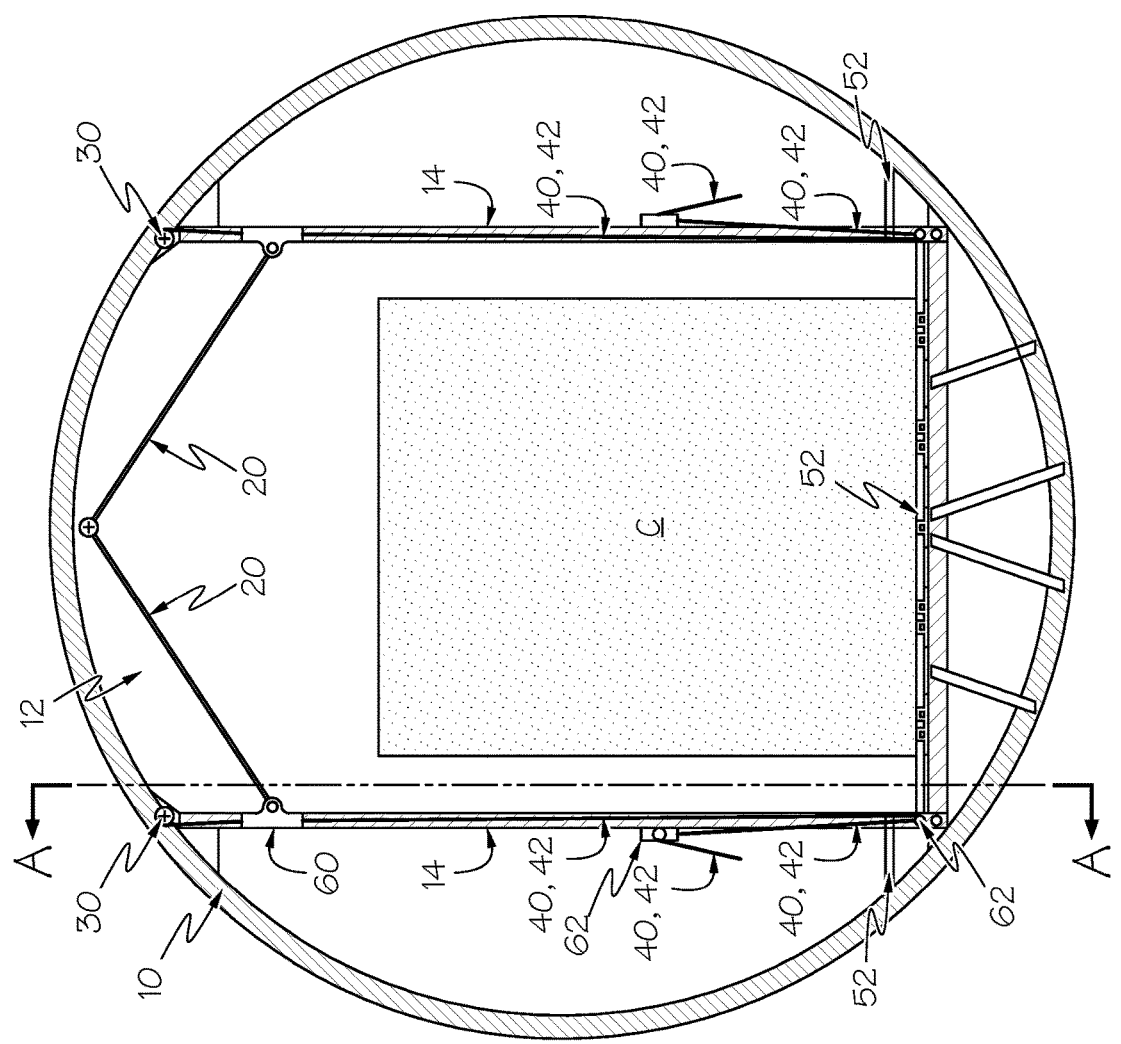
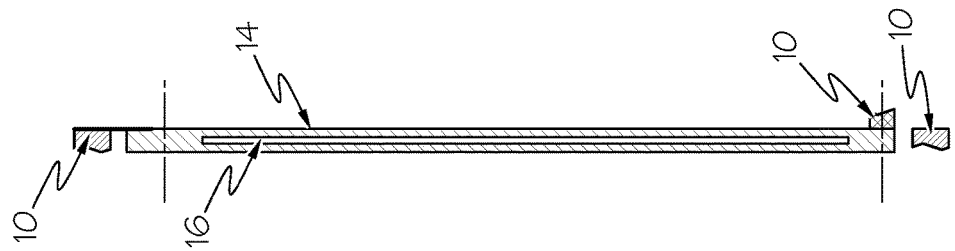
FIG. 10A
FIG. 10B

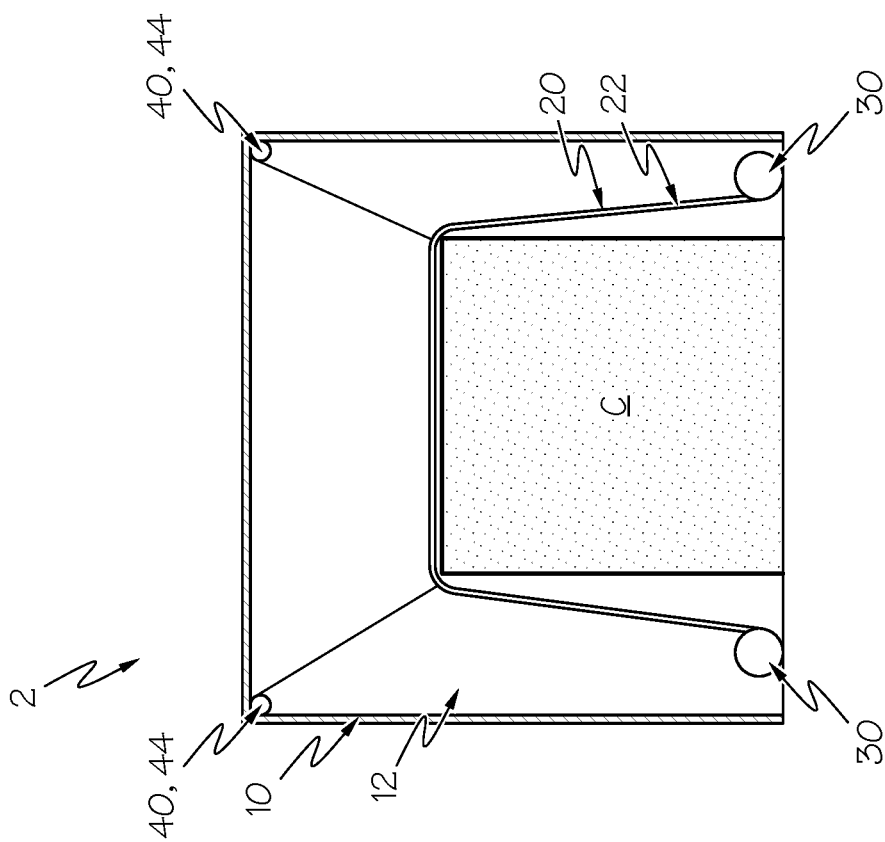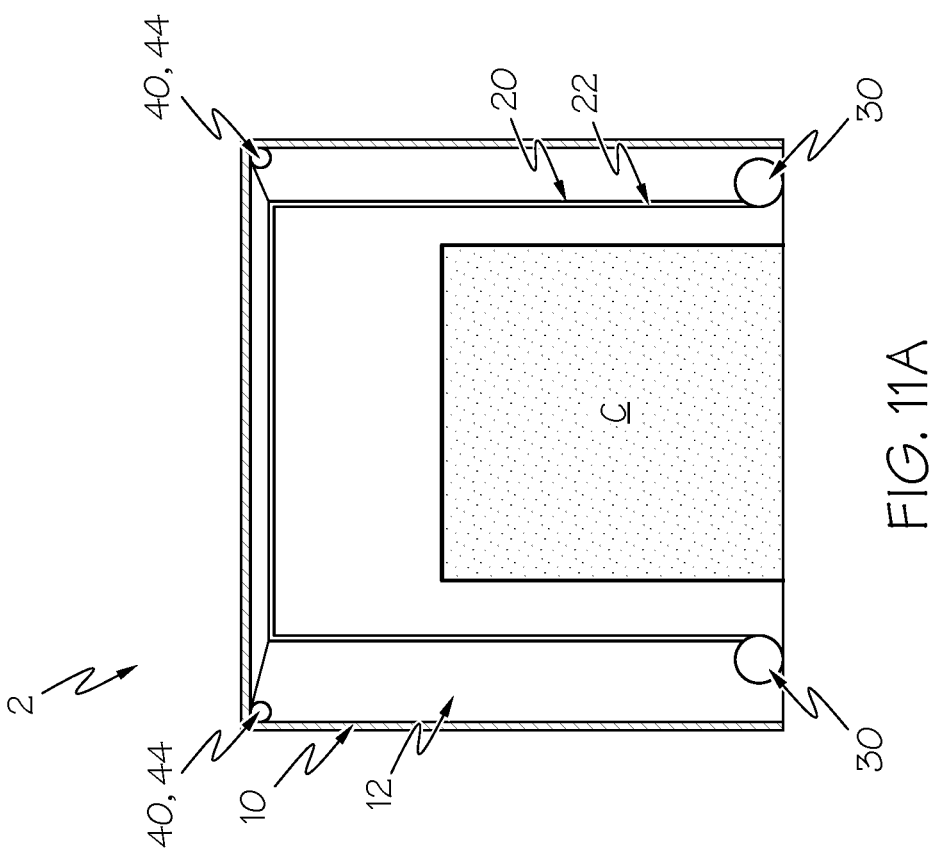

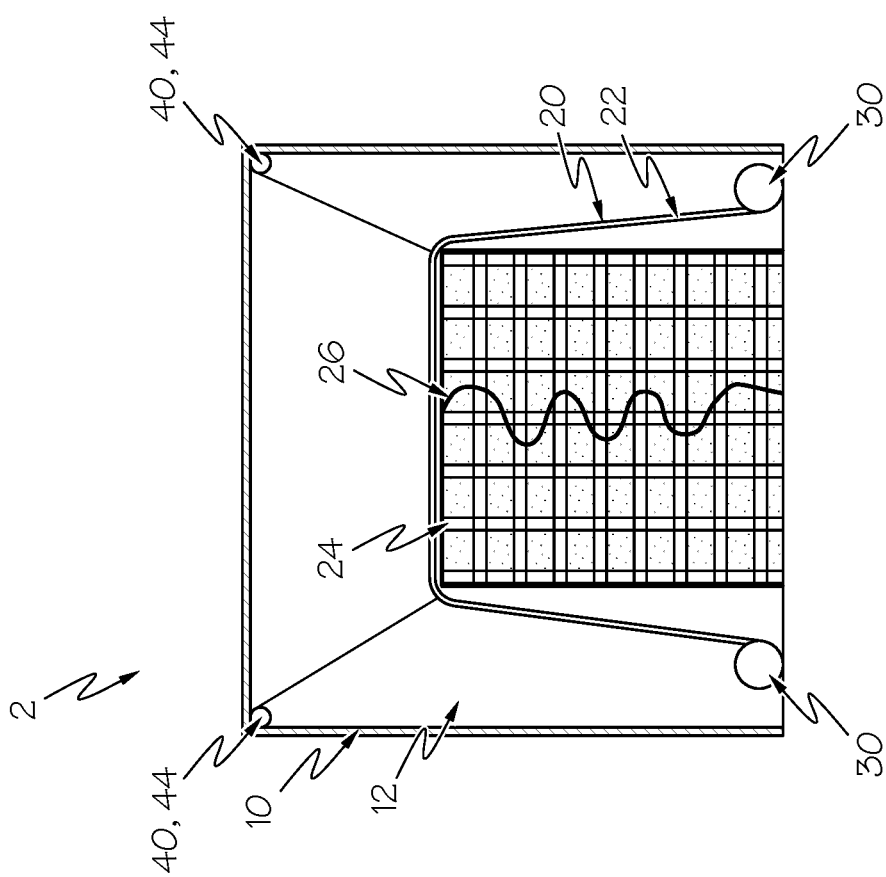
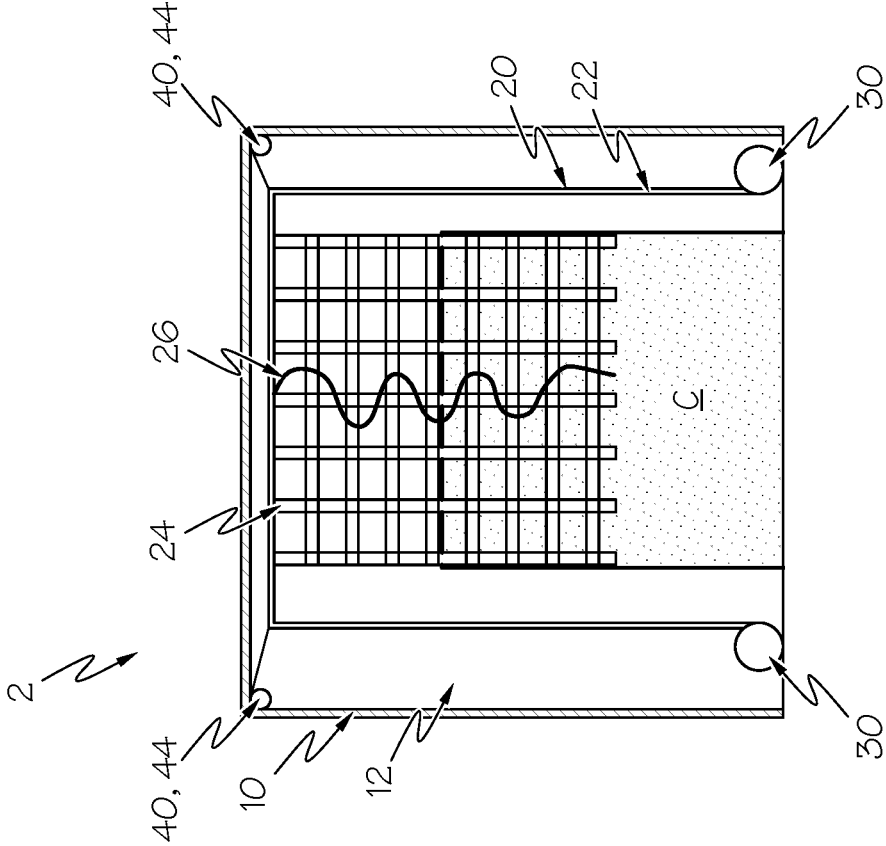

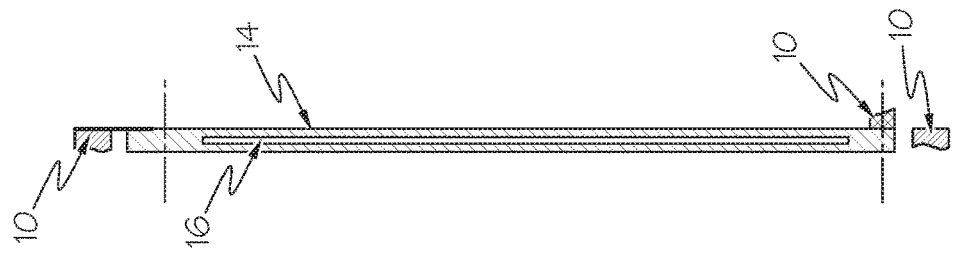
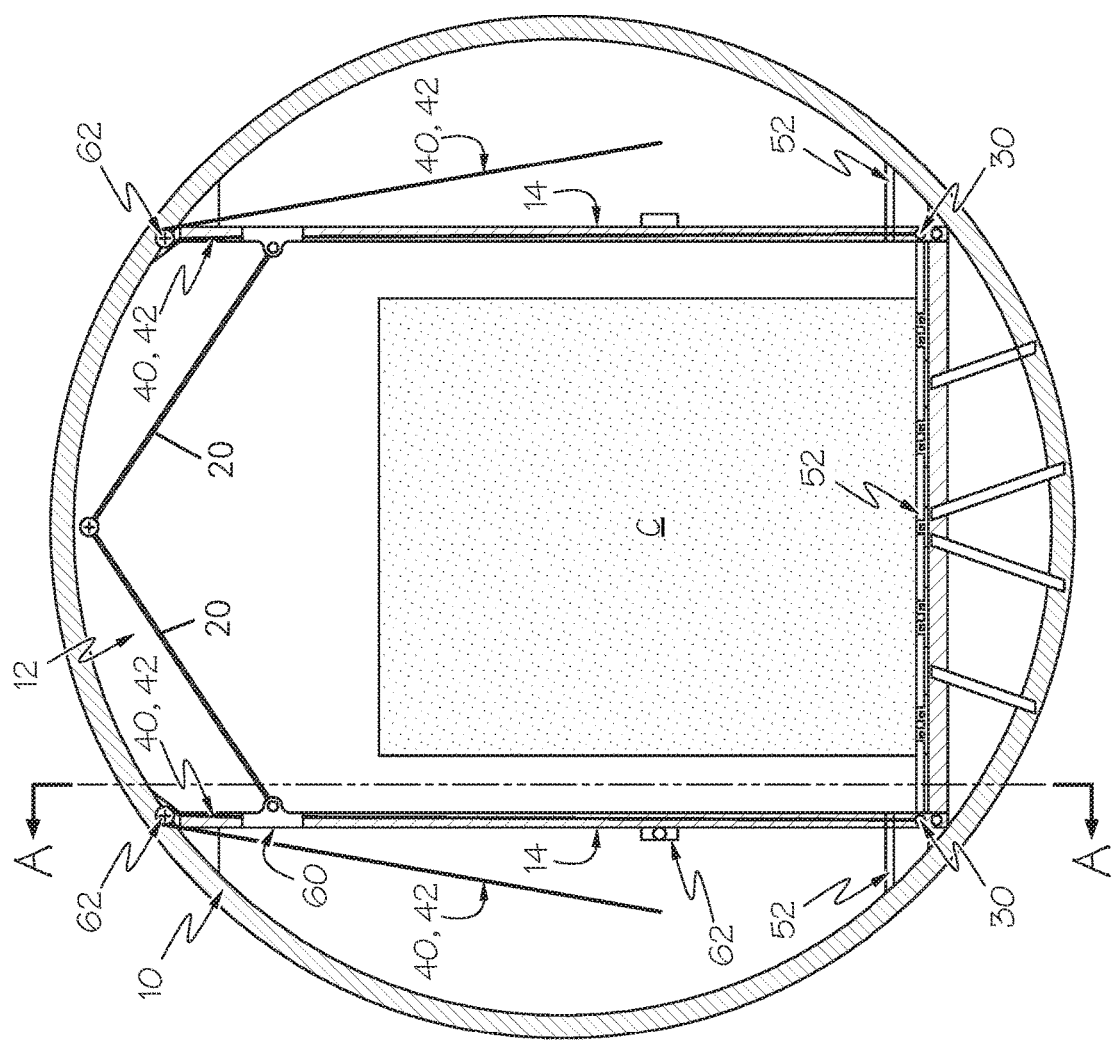

AIRCRAFT CARGO RESTRAINT SYSTEM AND METHOD FOR RESTRAINING CARGO WITHIN AN AIRCRAFT

FIELD

The present application relates to the field of aircraft cargo restraint systems and methods for restraining cargo within an aircraft.

BACKGROUND

Ensuring efficient operation of an aircraft includes proper weight and balance control, which includes ensuring proper restraint of cargo. Aircraft are often outfitted with some form of cargo restraint system that are used to maintain the position of cargo loads while in flight.

Cargo is commonly pre-positioned in specially designed containers or pre-secured onto specially designed pallets, which are designed to engage with floor restraints on the cabin deck to lock the containers or pallets into position.

Cargo can also be loaded into an aircraft fuselage and then secured to the fuselage framework using straps or nets. However, securing the cargo to the fuselage framework using straps or nets undesirably increases a downtime of the aircraft.

Accordingly, those skilled in the art continue with research and development in the field of aircraft cargo restraint systems and methods for restraining cargo within an aircraft.

SUMMARY

In one embodiment, an aircraft cargo restraint system includes a fuselage framework defining a cargo cabin, a webbing configured to restrain cargo positionable within the cargo cabin, one or more spring tension reels configured to bias the webbing towards a bottom of the cargo cabin, and one or more actuators configured to move the webbing toward a top of the cargo cabin against the bias of the one or more spring tension reels.

In another embodiment, an aircraft cargo restraint system includes a fuselage framework, a moveable carriage, a webbing, one or more spring tension reels, and one or more actuators. The fuselage framework defines a cargo cabin and includes at least one vertical stanchion. The moveable carriage is coupled to the at least one vertical stanchion. The webbing is configured to restrain cargo positionable within the cargo cabin. The webbing is coupled to the moveable carriage. The one or more spring tension reels are configured to bias the moveable carriage towards a top of the cargo cabin. The one or more actuators are configured to move the moveable carriage toward a bottom of the cargo cabin against the bias of the one or more spring tension reels.

In yet another embodiment, a method for restraining cargo within an aircraft includes spring tensioning a webbing towards a top of a cargo cabin defined by a fuselage framework by a bias of one or more spring tension reels, positioning cargo in the cargo cabin, and moving the webbing toward a bottom of the cargo cabin against the bias of the one or more spring tension reels by one or more actuators to restrain the cargo.

In yet another embodiment, an aircraft cargo restraint system includes a fuselage framework defining a cargo cabin, a webbing configured to restrain cargo positionable within the cargo cabin, one or more spring tension reels configured to bias the webbing towards a bottom of the cargo cabin, and one or more actuators configured to move the webbing toward a top of the cargo cabin against the bias of the one or more spring tension reels.

In yet another embodiment, an aircraft cargo restraint system includes a fuselage framework, a moveable carriage, a webbing, one or more spring tension reels, and one or more actuators. The fuselage framework defines a cargo cabin and includes at least one vertical stanchion. The moveable carriage is coupled to the at least one vertical stanchion. A webbing is configured to restrain cargo positionable within the cargo cabin. The webbing is coupled to the moveable carriage. The one or more spring tension reels are configured to bias the moveable carriage towards a bottom of the cargo cabin. The one or more actuators are configured to move the webbing toward a top of the cargo cabin against the bias of the one or more spring tension reels.

In yet another embodiment, a method for restraining cargo within an aircraft includes spring tensioning a webbing towards a bottom of a cargo cabin defined by a fuselage framework by a bias of one or more spring tension reels, moving the webbing toward a top of the cargo cabin against the bias of the one or more spring tension reels by one or more actuators, positioning cargo in the cargo cabin, and moving the webbing toward a bottom of the cargo cabin by the bias of the one or more spring tension reels to restrain the cargo.

Other embodiments of the disclosed aircraft cargo restraint system and method for restraining cargo within an aircraft will become apparent from the following detailed description, the accompanying drawings and the appended claims.

BRIEF DESCRIPTION OF THE DRAWINGS

FIG. 3A is a cross-sectional representation of a third exemplary aircraft cargo restraint system of the present description in a retracted position.

FIG. 3B is a cross-sectional representation of the third exemplary aircraft cargo restraint system of the present description in a deployed position.

FIG. 4A is a cross-sectional representation of a fourth exemplary aircraft cargo restraint system of the present description in a retracted position.

FIG. 4B is a cross-sectional representation of the fourth exemplary aircraft cargo restraint system of the present description in a deployed position.

FIG. 7A is a cross-sectional representation of a seventh exemplary aircraft cargo restraint system of the present description in a retracted position.

FIG. 7B is a cross-sectional representation of the seventh exemplary aircraft cargo restraint system of the present description in a deployed position.

FIG. 9A is a cross-sectional representation of a ninth exemplary aircraft cargo restraint system of the present description in a retracted position.

FIG. 9B is a cross-sectional representation of the ninth exemplary aircraft cargo restraint system of the present description in a deployed position.

FIG. 10A is a cross-sectional representation of a tenth exemplary aircraft cargo restraint system of the present description in a retracted position.

FIG. 10B is a sectional view along line A-A of FIG. 10A.

FIG. 11A is a cross-sectional representation of an eleventh exemplary aircraft cargo restraint system of the present description in a retracted position.

FIG. 11B is a cross-sectional representation of the eleventh exemplary aircraft cargo restraint system of the present description in a deployed position.

FIG. 12A is a cross-sectional representation of a twelfth exemplary aircraft cargo restraint system of the present description in a retracted position.

FIG. 12B is a cross-sectional representation of the twelfth exemplary aircraft cargo restraint system of the present description in a deployed position.

FIG. 14A is a cross-sectional representation of a fourteenth exemplary aircraft cargo restraint system of the present description in a retracted position.

FIG. 14B is a sectional view along line A-A of FIG. 14A.

DETAILED DESCRIPTION

Figure 1A:
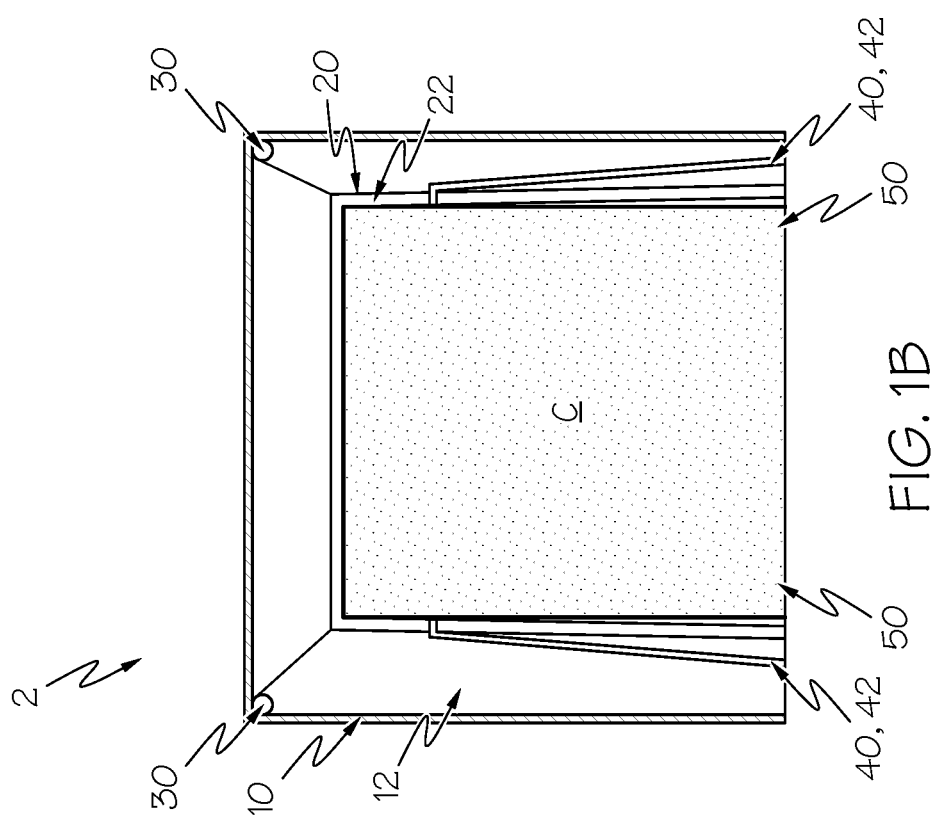
FIG. 1A is a cross-sectional representation of a first exemplary aircraft cargo restraint system of the present description in a retracted position.

FIGS. 1A, 1B, 2A, 2B, 3A, 3B, 4A, 4B, 5A, 5B, 6A, 6B, 7A, 7B, 8A, 8B, 9A, 9B, 10A, and 10B are cross-sectional representations of exemplary aircraft cargo restraint systems in which a webbing for restraining cargo is biased towards a top of a cargo cabin. FIGS. 11A, 11B, 12A, 12B, 13A, 13B, 14A, and 14B are cross-sectional representations of exemplary aircraft cargo restraint systems in which a webbing for restraining cargo is biased towards a bottom of a cargo cabin.

In one aspect, the aircraft cargo restraint system 2 includes a fuselage framework 10 defining a cargo cabin 12, a webbing 20 configured to restrain cargo C positionable within the cargo cabin 12, one or more spring tension reels 30 configured to bias the webbing 20 towards a top of the cargo cabin 12, and one or more actuators 40 configured to move the webbing 20 toward a bottom of the cargo cabin 12 against the bias of the one or more spring tension reels 30.

In another aspect, the aircraft cargo restraint system 2 includes a fuselage framework 10 defining a cargo cabin 12, a webbing 20 configured to restrain cargo C positionable within the cargo cabin 12, one or more spring tension reels 30 configured to bias the webbing 20 towards a bottom of the cargo cabin 12, and one or more actuators 40 configured to move the webbing 20 toward a top of the cargo cabin 12 against the bias of the one or more spring tension reels 30.

The fuselage framework 10 is intended to encompass an aircraft fuselage and any firmly positioned structural components contained within the aircraft fuselage, including, for example, decks, stringers, and stanchions.

The webbing 20 is intended to include any flexible material capable of restraining cargo C positionable within the cargo cabin 12, including, for example, straps and nets.

The one or more spring tension reels 30 is intended to include any spring-driven reel capable of biasing the webbing 20 towards the top or bottom of the cargo cabin. In a non-limiting example, the one or more spring tension reels 30 may include one or more spring-driven retractable cable reels.

In an aspect, the one or more spring tension reels 30 are coupled to the webbing 20. Alternatively, the one or more spring tension reels 30 are coupled to an intermediate device (e.g. a carriage) that is coupled to the webbing 20.

In a specific example, the one or more spring tension reels 30 is only a first spring tension reel. In another specific example, the one or more spring tension reels 30 is a first spring tension reel and a second spring tension reel. In yet another specific example, the one or more spring tension reels 30 includes three or more spring tension reels.

The one or more actuators 40 is intended to include any automated or manual actuator devices that are capable of moving the webbing 20 toward a top or bottom of the cargo cabin 12 against the bias of the one or more spring tension reels 30. In a non-limiting example, the one or more actuators 40 include one or more winches 44 for automatically moving the webbing 20 toward a top or bottom of the cargo cabin 12 against the bias of the one or more spring tension reels 30. In another non-limiting example, the one or more actuators 40 include one or more actuation straps 42 for manually moving the webbing 20 toward a top or bottom of the cargo cabin 12 against the bias of the one or more spring tension reels 30.

In a specific example, the one or more actuators 40 is only a first actuator, e.g. a first winch. In another specific example, the one or more actuators 40 is a first actuator and a second actuator, e.g. a first winch and a second winch. In yet another specific example, the one or more actuators 40 includes three or more actuators, e.g. three or more winches.

When the one or more actuators 40 are configured to move the webbing 20 toward a bottom of the cargo cabin 12 against the bias of the one or more spring tension reels 30, the one or more actuators 40 may provide a force sufficient for locking the webbing 20 to the fuselage framework 10. Alternatively, the one or more actuators 40 may merely provide a force sufficient for biasing the webbing 20 towards a bottom of the cargo cabin, and a separate structure (e.g. one or more locking hooks) may be employed for locking the webbing 20 to the fuselage framework 10.

When the one or more spring tension reels 30 are configured to bias the webbing 20 toward a bottom of the cargo cabin 12, the one or more spring tension reels 30 may provide a force sufficient for locking the webbing 20 to the fuselage framework 10. Alternatively, the one or more spring tension reels 30 may merely provide a force sufficient for biasing the webbing 20 towards a bottom of the cargo cabin, and a separate structure (e.g. one or more locking hooks) may be employed for locking the webbing 20 to the fuselage framework 10.

The following FIGS. 1 to 10 show exemplary aircraft cargo restraint systems in which one or more spring tension reels 30 are configured to bias the webbing 20 towards a top of the cargo cabin 12.

Figure 1B:
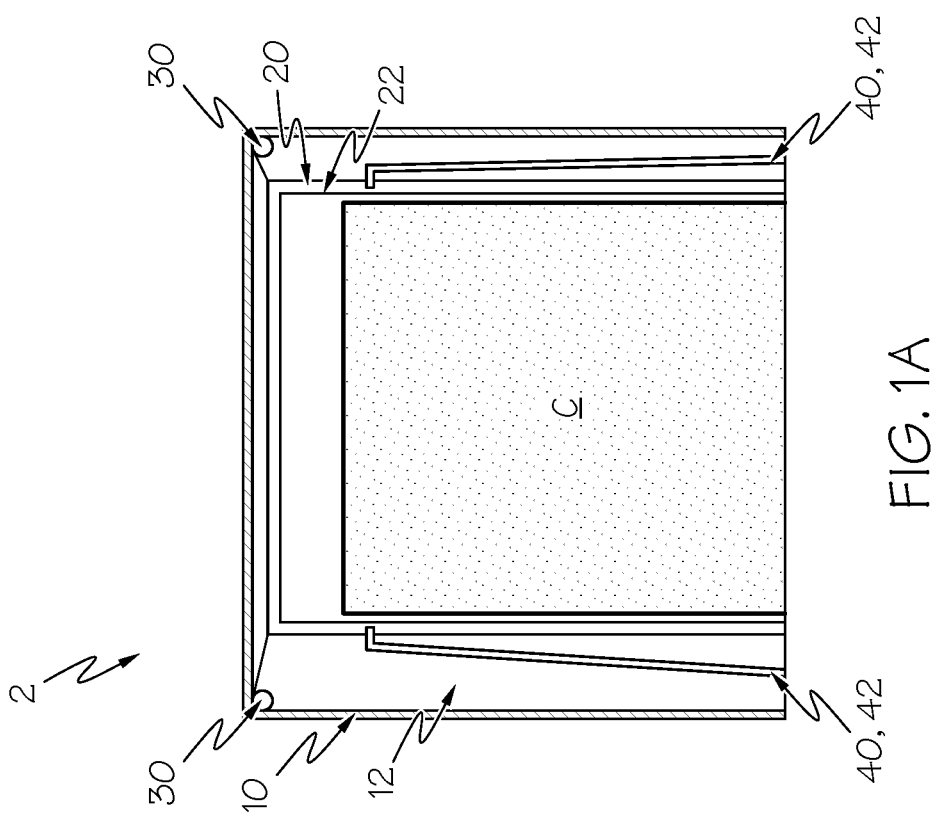
FIG. 1B is a cross-sectional representation of the first exemplary aircraft cargo restraint system of the present description in a deployed position.

FIG. 1A is a cross-sectional representation of a first exemplary aircraft cargo restraint system of the present description in a retracted position. FIG. 1B is a cross-sectional representation of the first exemplary aircraft cargo restraint system of the present description in a deployed position.

As shown in FIGS. 1A and 1B, the aircraft cargo restraint system 2 includes a fuselage framework 10 defining a cargo cabin 12, a webbing 20 in the form of one or more restraining straps 22 configured to restrain cargo C positionable within the cargo cabin 12, one or more spring tension reels 30 configured to bias the one or more restraining straps 22 towards a bottom of the cargo cabin 12, and one or more actuators 40 in the form of one or more actuation straps 42 for manually moving the one or more restraining straps 22 toward a bottom of the cargo cabin 12 against the bias of the one or more spring tension reels 30. The one or more restraining straps 22 is intended to include any straps capable of restraining cargo C positionable within the cargo cabin 12. In a non-limiting example, the one or more straps may be 5,000 lbs rated aircraft cargo straps.

Referring to FIG. 1A, the aircraft cargo restraint system 2 is shown with the one or more restraining straps 22 in a retracted position, such that cargo C may be readily loaded or unloaded to and from the cargo cabin 12. In the retracted position, the one or more restraining straps 22 have been biased towards a top of the cargo cabin 12 by the one or more spring tension reels 30, thus permitting loading of the cargo C to and from the cargo cabin 12.

Referring to FIG. 1B, the aircraft cargo restraint system 2 is shown with the one or more restraining straps 22 in a deployed position, such that cargo C is restrained by the one or more restraining straps 22. In the deployed position, the one or more restraining straps 22 have been manually moved toward a bottom of the cargo cabin 12 by manual activation (e.g., pulling) of the one or more actuation straps 42 against the bias of the one or more spring tension reels 30. A separate structure may be employed for locking the one or more restraining straps 22 to the fuselage framework 10.

By restraining the cargo C using the one or more restraining straps 22, the cargo C can be restrained in the vertical and horizontal directions. Additionally, it should be understood that one or more additional straps may be added to restrain the cargo C in the longitudinal directions, i.e. perpendicular to the cross-sectional plane of FIGS. 4A and 4B.

Figure 2A:
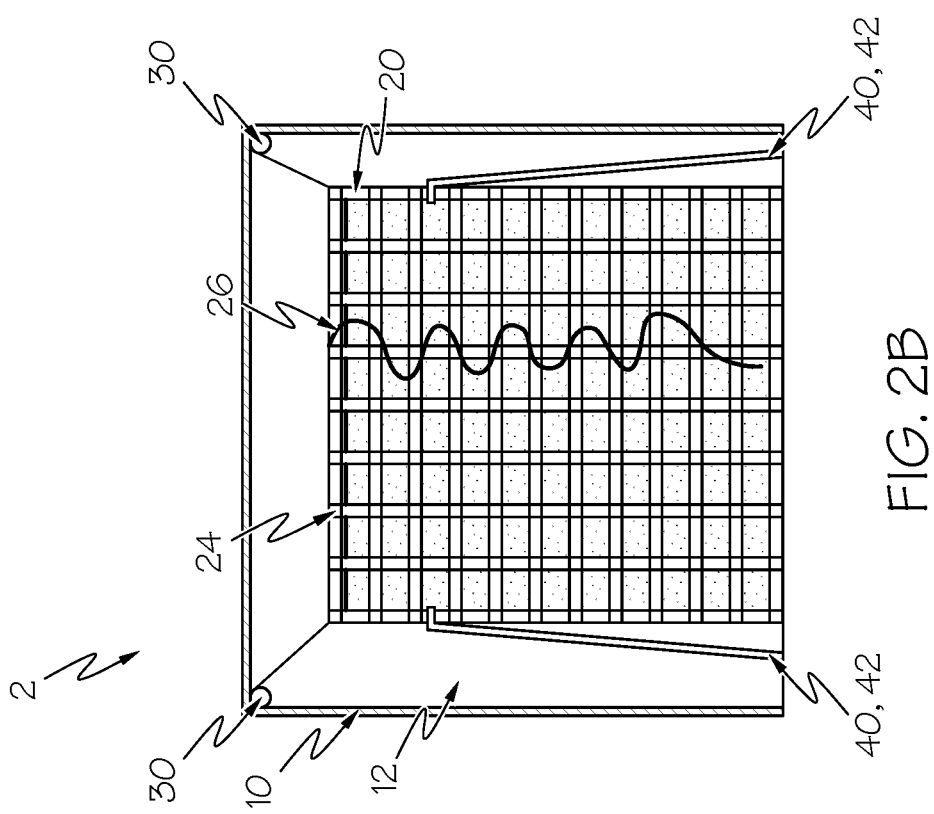
FIG. 2A is a cross-sectional representation of a second exemplary aircraft cargo restraint system of the present description in a retracted position.
Figure 2B:
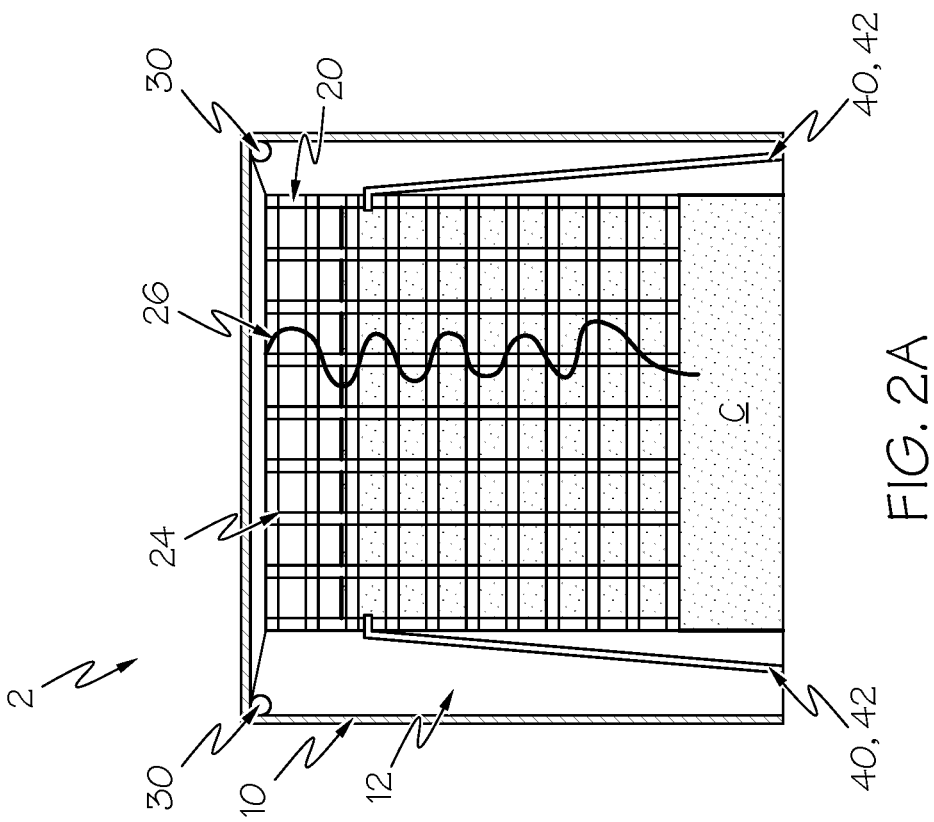
FIG. 2B is a cross-sectional representation of the second exemplary aircraft cargo restraint system of the present description in a deployed position.

FIG. 2A is a cross-sectional representation of a second exemplary aircraft cargo restraint system of the present description in a retracted position. FIG. 2B is a cross-sectional representation of the second exemplary aircraft cargo restraint system of the present description in a deployed position.

As shown in FIGS. 2A and 2B, the aircraft cargo restraint system 2 includes a fuselage framework 10 defining a cargo cabin 12, a webbing 20 in the form of one or more nets 24 configured to restrain cargo C positionable within the cargo cabin 12, one or more spring tension reels 30 configured to bias the one or more nets 24 towards a bottom of the cargo cabin 12, and one or more actuation straps 42 for manually moving the one or more nets 24 toward a bottom of the cargo cabin 12 against the bias of the one or more spring tension reels 30. The one or more nets 24 is intended to include any nets capable of restraining cargo C positionable within the cargo cabin 12.

Referring to FIG. 2A, the aircraft cargo restraint system 2 is shown with the one or more nets 24 in a retracted position, such that cargo C may be readily loaded or unloaded to and from the cargo cabin 12. In the retracted position, the one or more nets 24 have been biased towards a top of the cargo cabin 12 by the one or more spring tension reels 30, thus permitting loading of the cargo C to and from the cargo cabin 12.

Referring to FIG. 2B, the aircraft cargo restraint system 2 is shown with the one or more nets 24 in a deployed position, such that cargo C is restrained by the one or more nets 24. In the deployed position, the one or more nets 24 have been manually moved toward a bottom of the cargo cabin 12 by manual activation (e.g., pulling) of the one or more actuation straps 42 against the bias of the one or more spring tension reels 30. A separate structure may be employed for locking the one or more nets 24 to the fuselage framework 10. Additionally, as shown, the aircraft cargo restraint system 2 may further include one or more tensioning straps 26 for tensioning the one or more nets 24 around cargo C positioned within the cargo cabin 12.

By restraining the cargo C using the one or more nets 24, the cargo C can be restrained in the vertical, horizontal, and longitudinal directions. Additionally, although FIGS. 2A and 2B do not include one or more restraining straps 22, it should be understood that the one or more restraining straps 22 may be added such as illustrated in FIGS. 2A and 2B.

FIG. 3A is a cross-sectional representation of a third exemplary aircraft cargo restraint system of the present description in a retracted position.

FIG. 3B is a cross-sectional representation of the third exemplary aircraft cargo restraint system of the present description in a deployed position.

As shown in FIGS. 3A and 3B, the aircraft cargo restraint system 2 may additionally include one or more locking hooks 50 for locking the webbing 20, e.g. one or more nets 24, to the fuselage framework 10. The one or more locking hooks 50 may function by hooking onto the one or more nets 24 and pulling towards the fuselage framework 10 to lock the one or more nets 24 to the fuselage framework 10, such as by compression of the one or more locking hooks 50 until the cargo C is locked to the fuselage framework 10. In a non-limiting example, the one or more locking hooks 50 may include one or more reefing hooks. Additionally, as shown, the aircraft cargo restraint system 2 may further include one or more tensioning straps 26 for tensioning the one or more nets 24 around cargo C positioned within the cargo cabin 12.

By locking the cargo C contained with the one or more nets 24 to the fuselage framework 10 using the one or more locking hooks 50, the cargo C can be restrained in the vertical, horizontal, and longitudinal directions.

Additionally, although FIGS. 3A and 3B do not include one or more restraining straps 22, it should be understood that the one or more restraining straps 22 may be added.

FIG. 4A is a cross-sectional representation of a fourth exemplary aircraft cargo restraint system of the present description in a retracted position. FIG. 4B is a cross-sectional representation of the fourth exemplary aircraft cargo restraint system of the present description in a deployed position.

As shown in FIGS. 4A and 4B, the aircraft cargo restraint system 2 includes a fuselage framework 10 defining a cargo cabin 12, a webbing 20 in the form of one or more restraining straps 22 configured to restrain cargo C positionable within the cargo cabin 12, one or more spring tension reels 30 configured to bias the one or more restraining straps 22 towards a bottom of the cargo cabin 12, and one or more actuators 40 in the form of one or more winches 44 configured to automatically move the one or more restraining straps 22 toward a bottom of the cargo cabin 12 against the bias of the one or more spring tension reels 30. The one or more restraining straps 22 is intended to include any straps capable of restraining cargo C positionable within the cargo cabin 12. In a non-limiting example, the one or more straps may be 5,000 lbs rated aircraft cargo straps.

Referring to FIG. 4A, the aircraft cargo restraint system 2 is shown with the one or more restraining straps 22 in a retracted position, such that cargo C may be readily loaded or unloaded to and from the cargo cabin 12. In the retracted position, the one or more restraining straps 22 have been biased towards a top of the cargo cabin 12 by the one or more spring tension reels 30, thus permitting loading of the cargo C to and from the cargo cabin 12.

Referring to FIG. 4B, the aircraft cargo restraint system 2 is shown with the one or more restraining straps 22 in a deployed position, such that cargo C is restrained by the one or more restraining straps 22. In the deployed position, the one or more restraining straps 22 have been automatically moved toward a bottom of the cargo cabin 12 by the one or more winches 44 against the bias of the one or more spring tension reels 30. The one or more winches 44 may provide a force sufficient for locking the one or more restraining straps 22 to the fuselage framework 10. Alternatively, the one or more winches 44 may merely provide a force sufficient for biasing the one or more restraining straps 22 towards a bottom of the cargo cabin, and a separate structure may be employed for locking the webbing 20 to the fuselage framework 10.

By restraining the cargo C using the one or more restraining straps 22, the cargo C can be restrained in the vertical and horizontal directions. Additionally, it should be understood that one or more additional straps may be added to restrain the cargo C in the longitudinal directions, i.e. perpendicular to the cross-sectional plane.

Figure 5B:
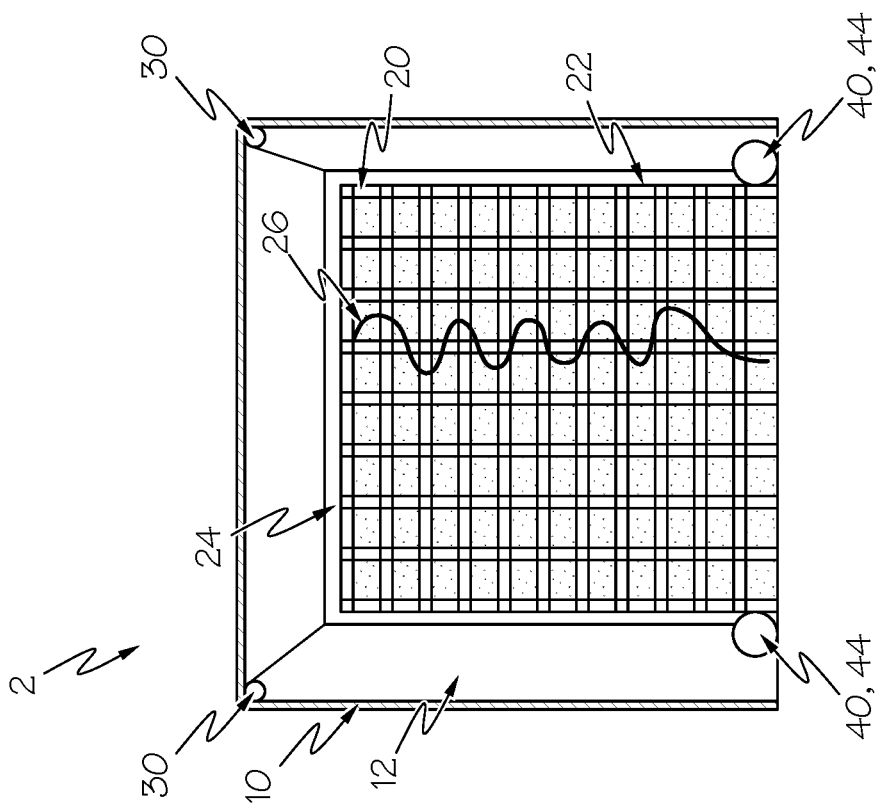
FIG. 5B is a cross-sectional representation of the fifth exemplary aircraft cargo restraint system of the present description in a deployed position.
Figure 5A:
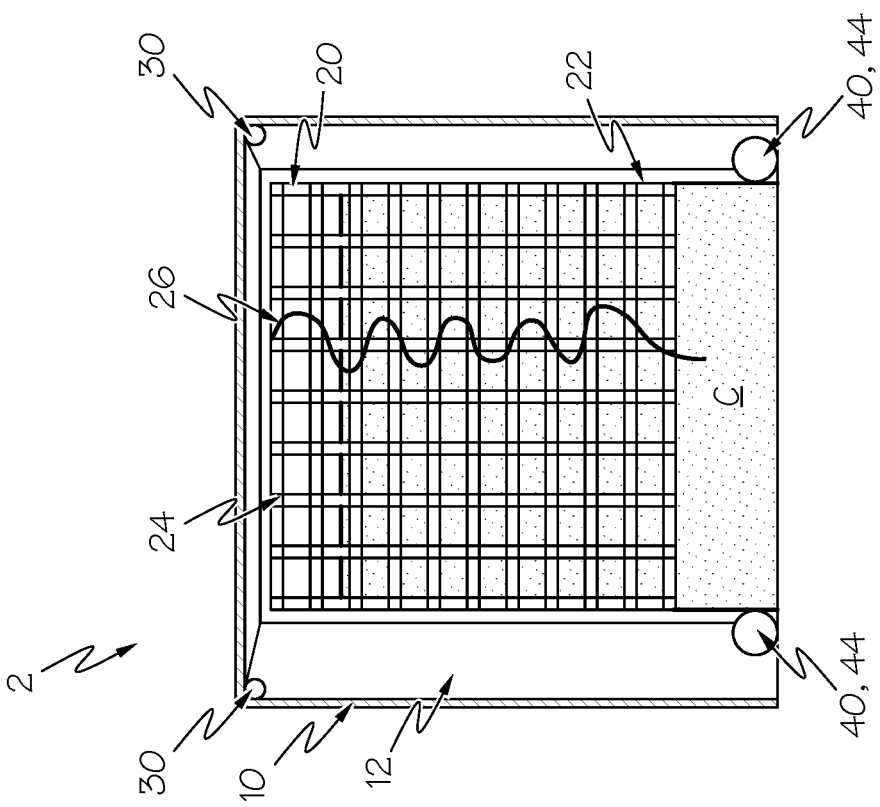
FIG. 5A is a cross-sectional representation of a fifth exemplary aircraft cargo restraint system of the present description in a retracted position.

FIG. 5A is a cross-sectional representation of a fifth exemplary aircraft cargo restraint system of the present description in a retracted position. FIG. 5B is a cross-sectional representation of the fifth exemplary aircraft cargo restraint system of the present description in a deployed position.

As shown in FIGS. 5A and 5B, the aircraft cargo restraint system 2 includes a fuselage framework 10 defining a cargo cabin 12, a webbing 20 in the form of one or more restraining straps 22 and one or more nets 24 configured to restrain cargo C positionable within the cargo cabin 12, one or more spring tension reels 30 configured to bias the one or more restraining straps 22 and one or more nets 24 towards a bottom of the cargo cabin 12, and one or more winches 44 configured to automatically move the one or more restraining straps 22 and one or more nets 24 toward a bottom of the cargo cabin 12 against the bias of the one or more spring tension reels 30. The one or more restraining straps 22 is intended to include any straps capable of restraining cargo C positionable within the cargo cabin 12. In a non-limiting example, the one or more straps may be 5,000 lbs rated aircraft cargo straps.

Referring to FIG. 5A, the aircraft cargo restraint system 2 is shown with the one or more restraining straps 22 and the one or more nets 24 in a retracted position, such that cargo C may be readily loaded or unloaded to and from the cargo cabin 12. In the retracted position, the one or more restraining straps 22 and the one or more nets 24 have been biased towards a top of the cargo cabin 12 by the one or more spring tension reels 30, thus permitting loading of the cargo C to and from the cargo cabin 12.

Referring to FIG. 5B, the aircraft cargo restraint system 2 is shown with the one or more restraining straps 22 and the one or more nets 24 in a deployed position, such that cargo C is restrained by the one or more restraining straps 22 and the one or more nets 24. In the deployed position, the one or more restraining straps 22 and the one or more nets 24 have been automatically moved toward a bottom of the cargo cabin 12 by the one or more winches 44 against the bias of the one or more spring tension reels 30. The one or more winches 44 may provide a force sufficient for locking the one or more restraining straps 22 and the one or more nets 24 to the fuselage framework 10, or a separate structure may be employed for locking the one or more restraining straps 22 and one or more nets 24 to the fuselage framework 10. Additionally, as shown, the aircraft cargo restraint system 2 may further include one or more tensioning straps 26 for tensioning the one or more nets 24 around cargo C positioned within the cargo cabin 12.

By restraining the cargo C using the one or more nets 24, the cargo C can be restrained in the vertical, horizontal, and longitudinal directions. Additionally, although FIGS. 5A and 5B include one or more restraining straps 22 and one or more nets 24 coupled to the one or more restraining straps 22, it should be understood that the one or more restraining straps 22 may be omitted, and the one or more nets 24 may be coupled to the one or more spring tension reels 30 and the one or more winches 44.

Figure 6B:
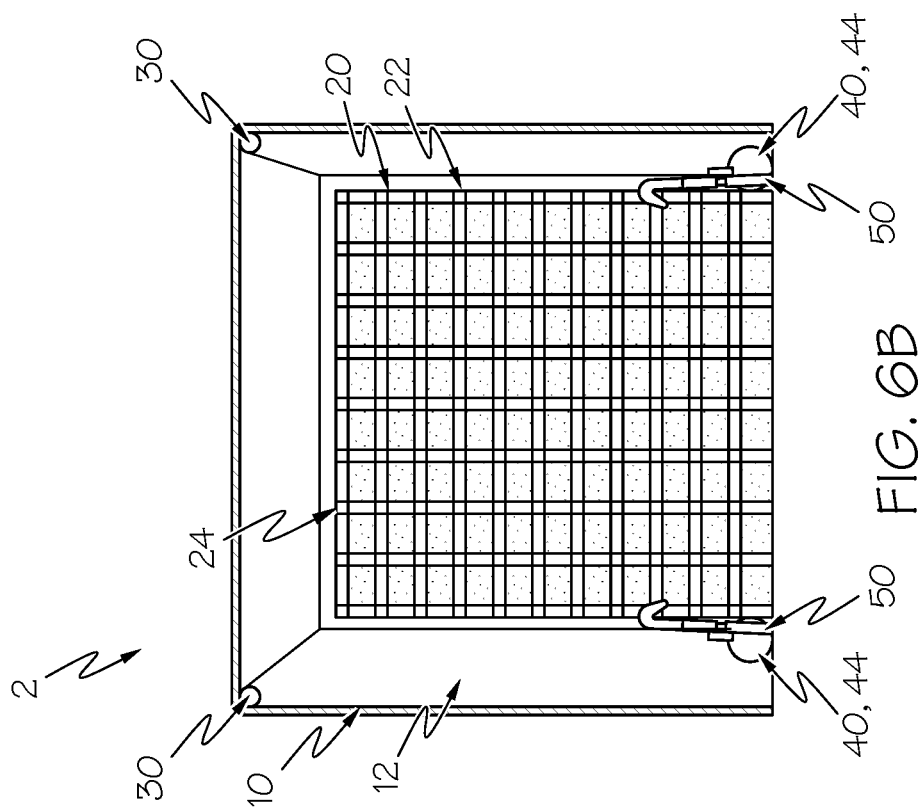
FIG. 6B is a cross-sectional representation of the sixth exemplary aircraft cargo restraint system of the present description in a deployed position.
Figure 6A:
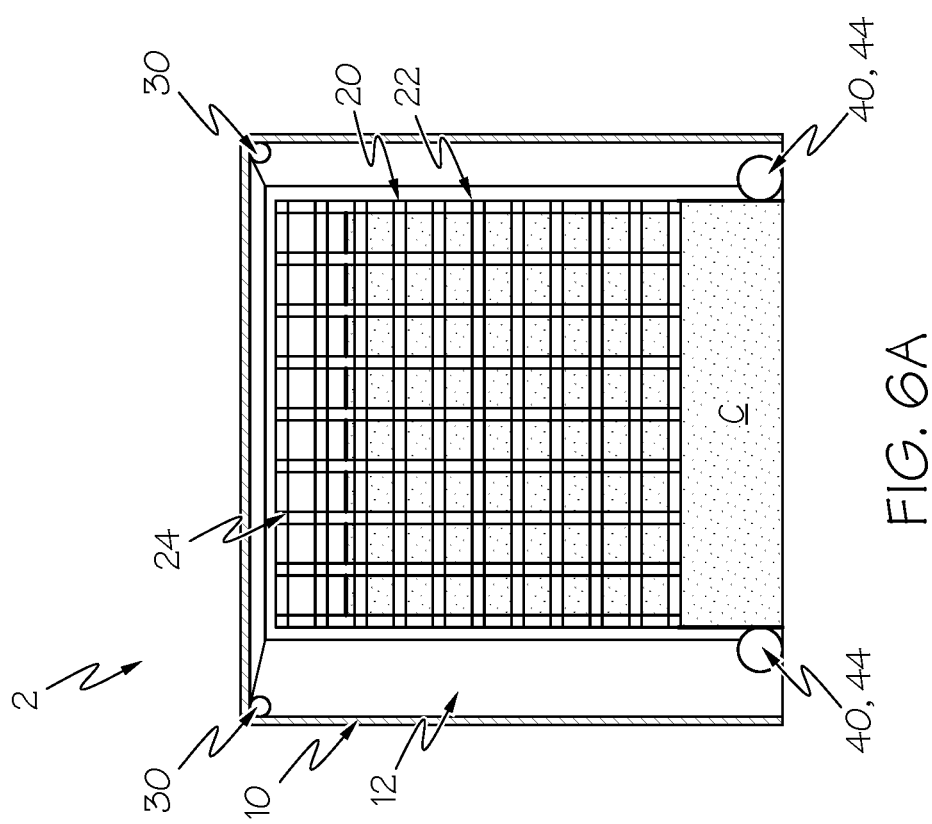
FIG. 6A is a cross-sectional representation of a sixth exemplary aircraft cargo restraint system of the present description in a retracted position.

FIG. 6A is a cross-sectional representation of a sixth exemplary aircraft cargo restraint system of the present description in a retracted position. FIG. 6B is a cross-sectional representation of the sixth exemplary aircraft cargo restraint system of the present description in a deployed position.

As shown in FIGS. 6A and 6B, the aircraft cargo restraint system 2 may additionally include one or more locking hooks 50 for locking the webbing 20, e.g. one or more nets 24, to the fuselage framework 10. The one or more locking hooks 50 may function by hooking onto the one or more nets 24 and pulling towards the fuselage framework 10 to lock the one or more nets 24 to the fuselage framework 10, such as by compression of the one or more locking hooks 50 until the cargo C is locked to the fuselage framework 10. In a non-limiting example, the one or more locking hooks 50 may include one or more reefing hooks. Additionally, as shown, the aircraft cargo restraint system 2 may further include one or more tensioning straps 26 for tensioning the one or more nets 24 around cargo C positioned within the cargo cabin 12.

By locking the cargo C contained with the one or more nets 24 to the fuselage framework 10 using the one or more locking hooks 50, the cargo C can be restrained in the vertical, horizontal, and longitudinal directions.

Additionally, although FIGS. 6A and 6B include one or more restraining straps 22 and one or more nets 24 coupled to the one or more restraining straps 22, it should be understood that the one or more restraining straps 22 may be omitted, and the one or more nets 24 may be coupled to the one or more spring tension reels 30 and the one or more winches 44.

FIG. 7A is a cross-sectional representation of a seventh exemplary aircraft cargo restraint system of the present description in a retracted position. FIG. 7B is a cross-sectional representation of the seventh exemplary aircraft cargo restraint system of the present description in a deployed position.

As shown in FIGS. 7A and 7B, the aircraft cargo restraint system 2 includes a fuselage framework 10 defining a cargo cabin 12, a webbing 20 in the form of one or more restraining straps 22 configured to restrain cargo C positionable within the cargo cabin 12, a low spring tension reel 31 and a high spring tension reel 32 configured to bias the one or more restraining straps 22 towards a bottom of the cargo cabin 12, and an actuator 40 in the form of a winch 44 configured to automatically move the one or more restraining straps 22 toward a bottom of the cargo cabin 12 against the bias of the low spring tension reel 31 and the high spring tension reel 32. Although the actuator 40 is shown as a winch 44 in FIGS. 7A and 7B, it is understood that the actuator may instead take the form an actuation strap 42.

Referring to FIG. 7A, the aircraft cargo restraint system 2 is shown with the one or more restraining straps 22 in a retracted position, such that cargo C may be readily loaded or unloaded to and from the cargo cabin 12. In the retracted position, the one or more restraining straps 22 have been biased towards a top of the cargo cabin 12 by the low spring tension reel 31 and the high spring tension reel 32, thus permitting loading of the cargo C to and from the cargo cabin 12.

Referring to FIG. 7B, the aircraft cargo restraint system 2 is shown with the one or more restraining straps 22 in a deployed position, such that cargo C is restrained by the one or more restraining straps 22. In the deployed position, the one or more restraining straps 22 have been automatically moved toward a bottom of the cargo cabin 12 by the winch 44 against the bias of the low spring tension reel 31 and the high spring tension reel 32.

As the winch 44 pulls down the one or more restraining straps 22 towards a bottom of the cargo cabin 12, the high spring tension reel 32 initially resists against the force applied by the winch 44 while the high spring tension reel 31 releases against the force applied by the actuator 40. Accordingly, the one or more restraining straps 22 are moved to the deployed position in a manner that avoids or minimizes rubbing the one or more restraining straps 22 against the cargo C to be restrained.

The winch 44 may provide a force sufficient for locking the one or more restraining straps 22 to the fuselage framework 10. Alternatively, the winch 44 may merely provide a force sufficient for biasing the one or more restraining straps 22 towards a bottom of the cargo cabin, and a separate structure may be employed for locking the webbing 20 to the fuselage framework 10.

By restraining the cargo C using the one or more restraining straps 22, the cargo C can be restrained in the vertical and horizontal directions. Additionally, it should be understood that one or more additional straps may be added to restrain the cargo C in the longitudinal directions, i.e. perpendicular to the cross-sectional plane of FIGS. 7A and 7B.

Figure 8A:
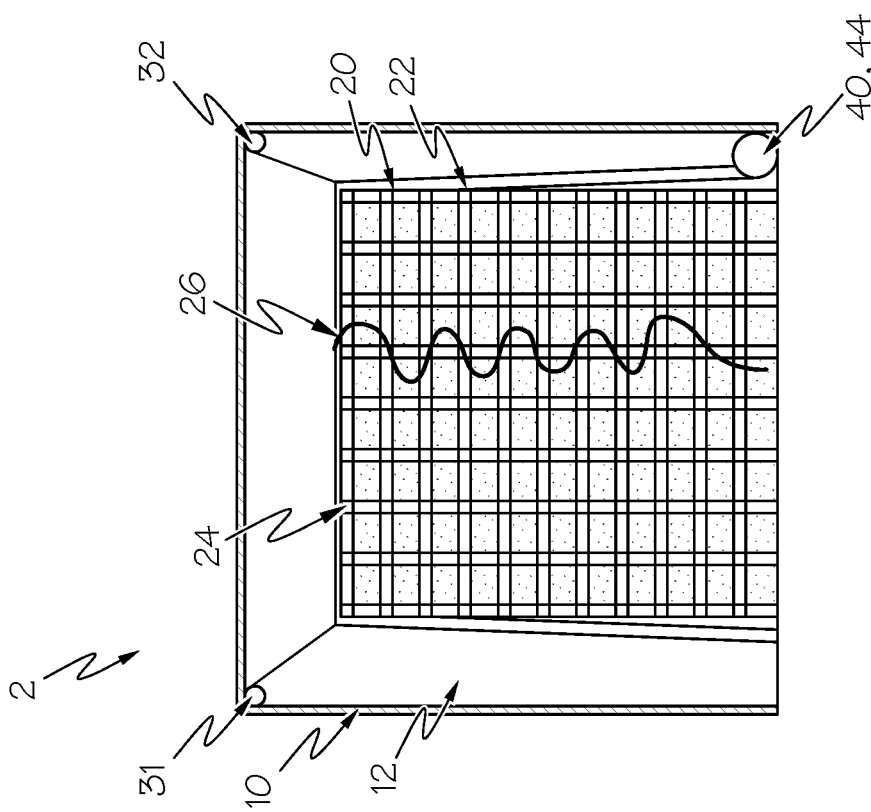
FIG. 8A is a cross-sectional representation of an eighth exemplary aircraft cargo restraint system of the present description in a retracted position.
Figure 8B:
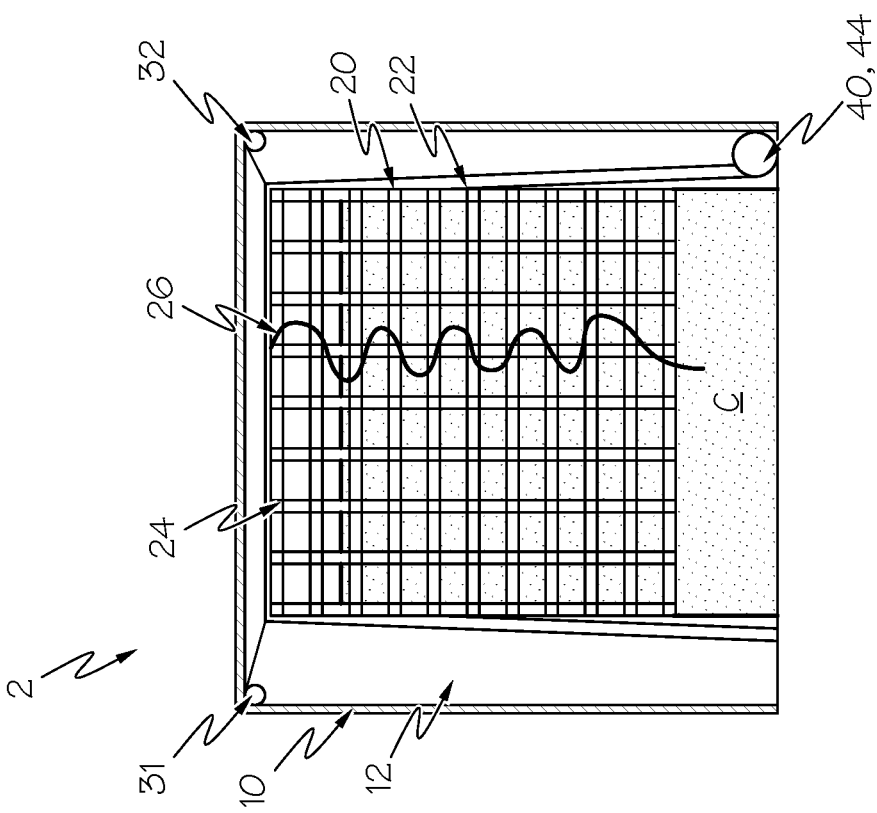
FIG. 8B is a cross-sectional representation of the eighth exemplary aircraft cargo restraint system of the present description in a deployed position.

FIG. 8A is a cross-sectional representation of an eighth exemplary aircraft cargo restraint system of the present description in a retracted position. FIG. 8B is a cross-sectional representation of the eighth exemplary aircraft cargo restraint system of the present description in a deployed position.

As shown in FIGS. 8A and 8B, the aircraft cargo restraint system 2 includes a fuselage framework 10 defining a cargo cabin 12, a webbing 20 in the form of one or more restraining straps 22 and one or more nets 24 configured to restrain cargo C positionable within the cargo cabin 12, a low spring tension reel 31 and a high spring tension reel 32 configured to bias the one or more restraining straps 22 and one or more nets 24 towards a bottom of the cargo cabin 12, and an actuator 40 in the form of a winch 44 configured to automatically move the one or more restraining straps 22 and one or more nets 24 toward a bottom of the cargo cabin 12 against the bias of the low spring tension reel 31 and the high spring tension reel 32. Although the actuator 40 is shown as a winch 44 in FIGS. 8A and 8B, it is understood that the actuator may instead take the form an actuation strap 42. Additionally, as shown, the aircraft cargo restraint system 2 may further include one or more tensioning straps 26 for tensioning the one or more nets 24 around cargo C positioned within the cargo cabin 12.

Referring to FIG. 8A, the aircraft cargo restraint system 2 is shown with the one or more restraining straps 22 and one or more nets 24 in a retracted position, such that cargo C may be readily loaded or unloaded to and from the cargo cabin 12. In the retracted position, the one or more restraining straps 22 and one or more nets 24 have been biased towards a top of the cargo cabin 12 by the low spring tension reel 31 and the high spring tension reel 32, thus permitting loading of the cargo C to and from the cargo cabin 12.

Referring to FIG. 8B, the aircraft cargo restraint system 2 is shown with the one or more restraining straps 22 and one or more nets 24 in a deployed position, such that cargo C is restrained by the one or more restraining straps 22. In the deployed position, the one or more restraining straps 22 and one or more nets 24 have been automatically moved toward a bottom of the cargo cabin 12 by the winch 44 against the bias of the low spring tension reel 31 and the high spring tension reel 32.

As the winch 44 pulls down the one or more restraining straps 22 and one or more nets 24 towards a bottom of the cargo cabin 12, the high spring tension reel 32 initially resists against the force applied by the winch 44 while the high spring tension reel 31 releases against the force applied by the winch 44. Accordingly, the one or more restraining straps 22 and one or more nets 24 are moved to the deployed position in a manner that avoids or minimizes rubbing the one or more restraining straps 22 against the cargo C to be restrained and that avoids or minimizes snagging of the one or more nets 24 with the cargo C to be restrained.

The winch 44 may provide a force sufficient for locking the one or more restraining straps 22 to the fuselage framework 10. Alternatively, the winch 44 may merely provide a force sufficient for biasing the one or more restraining straps 22 towards a bottom of the cargo cabin, and a separate structure may be employed for locking the webbing 20 to the fuselage framework 10.

By restraining the cargo C using the one or more nets 24, the cargo C can be restrained in the vertical, horizontal, and longitudinal directions. Additionally, although FIGS. 2A and 2B include one or more restraining straps 22 and one or more nets 24 coupled to the one or more restraining straps 22, it should be understood that the one or more restraining straps 22 may be omitted, and the one or more nets 24 may be coupled to the low spring tension reel 31, the high spring tension reel 32 and the winch 44.

FIG. 9A is a cross-sectional representation of a ninth exemplary aircraft cargo restraint system of the present description in a retracted position. FIG. 9B is a cross-sectional representation of the ninth exemplary aircraft cargo restraint system of the present description in a deployed position.

As shown in FIGS. 9A and 9B, the aircraft cargo restraint system 2 may additionally include one or more locking hooks 50 for locking the webbing 20, e.g. one or more nets 24, to the fuselage framework 10. The one or more locking hooks 50 may function by hooking onto the one or more nets 24 and pulling towards the fuselage framework 10 to lock the one or more nets 24 to the fuselage framework 10, such as by compression of the one or more locking hooks 50 until the cargo C is locked to the fuselage framework 10. In a non-limiting example, the one or more locking hooks 50 may include one or more reefing hooks. Additionally, as shown, the aircraft cargo restraint system 2 may further include one or more tensioning straps 26 for tensioning the one or more nets 24 around cargo C positioned within the cargo cabin 12.

By locking the cargo C contained with the one or more nets 24 to the fuselage framework 10 using the one or more locking hooks 50, the cargo C can be restrained in the vertical, horizontal, and longitudinal directions.

Additionally, although FIGS. 9A and 9B include one or more restraining straps 22 and one or more nets 24 coupled to the one or more restraining straps 22, it should be understood that the one or more restraining straps 22 may be omitted, and the one or more nets 24 may be coupled to the low spring tension reel 31, the high spring tension reel 32 and the winch 44.

FIG. 10A is a cross-sectional representation of a tenth exemplary aircraft cargo restraint system of the present description in a retracted position. FIG. 10B is a sectional view along line A-A of FIG. 10A.

As shown in FIGS. 10A and 10B, the aircraft cargo restraint system 2 includes a fuselage framework 10, a moveable carriage 60, a webbing 20, one or more spring tension reels 30, and one or more actuators 40 in the form of one or more actuation straps 42. Although the one or more actuators 40 are shown in the form of one or more actuation straps 42, it is understood that the one or more actuation straps 42 may be actuated by one or more winches 44.

The fuselage framework 10 defines a cargo cabin 12 and includes at least one vertical stanchion 14. The fuselage framework may further include flooring structures 52. The at least one vertical stanchion 14 may take the form of a hollow tube having an interior cavity for passing a line of the one or more spring tension reels 30 and a strap 22 therethrough. As shown in FIG. 10B, the at least one vertical stanchion 14 may further include a stanchion slot 16.

The moveable carriage 60 is coupled to the at least one vertical stanchion 14 and is moveable along the at least one vertical stanchion 14 toward a top and bottom of the cargo cabin 12. The moveable carriage is further coupled, by way of the stanchion slot 16, to the line of the one or more spring tension reels 30 and to the one or more actuation straps 42.

The webbing 20 is configured to restrain cargo C positionable within the cargo cabin 12. The webbing 20 is coupled to the moveable carriage 60. By movement of the moveable carriage 60 toward a top and bottom of the cargo cabin 12, the webbing 20 is moveable to a retracted position at the top of the cargo cabin 12 and to a deployed position at the bottom of the cargo cabin 12.

As shown in FIG. 10A, the one or more spring tension reels 30 are configured to bias the moveable carriage 60 toward a top of the cargo cabin 12, and the one or more actuators 40 in the form of actuation straps 42 are configured to move the moveable carriage 60 toward a bottom of the cargo cabin 12 against the bias of the one or more spring tension reels 30. As shown, one or more pulleys 62 may be employed with the one or more actuation straps 42. Thus, control of the movement of the moveable carriage 60, and accordingly the webbing 20, is achieved by the bias of the one or more spring tension reels 30 and actuation of the one or more actuation straps 42.

The following FIGS. 11 to 14 show exemplary aircraft cargo restraint systems in which one or more spring tension reels 30 are configured to bias the webbing 20 towards a bottom of the cargo cabin 12.

FIG. 11A is a cross-sectional representation of an eleventh exemplary aircraft cargo restraint system of the present description in a retracted position. FIG. 11B is a cross-sectional representation of the eleventh exemplary aircraft cargo restraint system of the present description in a deployed position.

As shown in FIGS. 11A and 11B, the aircraft cargo restraint system 2 includes a fuselage framework 10 defining a cargo cabin 12, a webbing 20 in the form of one or more restraining straps 22 configured to restrain cargo C positionable within the cargo cabin 12, one or more spring tension reels 30 configured to bias the one or more restraining straps 22 towards a bottom of the cargo cabin 12, and one or more actuators 40 in the form of one or more winches 44 configured to automatically move the one or more restraining straps 22 toward a top of the cargo cabin 12 against the bias of the one or more spring tension reels 30. It is understood that the one or more winches 44 may be replaced with one or more actuation straps 42 for manually moving the one or more restraining straps 22 toward a top of the cargo cabin 12 against the bias of the one or more spring tension reels 30.

The one or more restraining straps 22 is intended to include any straps capable of restraining cargo C positionable within the cargo cabin 12. In a non-limiting example, the one or more straps may be 5,000 lbs rated aircraft cargo straps.

Referring to FIG. 11A, the aircraft cargo restraint system 2 is shown with the one or more restraining straps 22 in a retracted position, such that cargo C may be readily loaded or unloaded to and from the cargo cabin 12. In the retracted position, the one or more restraining straps 22 have been automatically moved toward a top of the cargo cabin 12 by the one or more winches 44 against the bias of the one or more spring tension reels 30, thus permitting loading of the cargo C to and from the cargo cabin 12.

Referring to FIG. 11B, the aircraft cargo restraint system 2 is shown with the one or more restraining straps 22 in a deployed position, such that cargo C is restrained by the one or more restraining straps 22. In the deployed position, the one or more restraining straps 22 have been biased towards a bottom of the cargo cabin 12 by the one or more spring tension reels 30 after release of the one or more winches 44. The one or more spring tension reels 30 may provide a force sufficient for locking the one or more restraining straps 22 to the fuselage framework 10, or a separate structure may be employed for locking the one or more restraining straps 22 to the fuselage framework 10.

By restraining the cargo C using the one or more restraining straps 22, the cargo C can be restrained in the vertical and horizontal directions. Additionally, it should be understood that one or more additional straps may be added to restrain the cargo C in the longitudinal directions, i.e. perpendicular to the cross-sectional plane of FIGS. 1A and 1B.

FIG. 12A is a cross-sectional representation of a twelfth exemplary aircraft cargo restraint system of the present description in a retracted position. FIG. 12B is a cross-sectional representation of the twelfth exemplary aircraft cargo restraint system of the present description in a deployed position.

As shown in FIGS. 12A and 12B, the aircraft cargo restraint system 2 includes a fuselage framework 10 defining a cargo cabin 12, a webbing 20 in the form of one or more restraining straps 22 and one or more nets 24 coupled with the one or more restraining straps 22, one or more spring tension reels 30 configured to bias the one or more restraining straps 22 towards a bottom of the cargo cabin 12, and one or more actuators 40 in the form of one or more winches 44 configured to automatically move the one or more restraining straps 22 toward a top of the cargo cabin 12 against the bias of the one or more spring tension reels 30. It is understood that the one or more winches 44 may be replaced with one or more actuation straps 42 for manually moving the one or more restraining straps 22 toward a top of the cargo cabin 12 against the bias of the one or more spring tension reels 30.

The one or more nets 24 is intended to include any nets capable of restraining cargo C positionable within the cargo cabin 12.

Referring to FIG. 12A, the aircraft cargo restraint system 2 is shown with the one or more restraining straps 22 and one or more nets 24 in a retracted position, such that cargo C may be readily loaded or unloaded to and from the cargo cabin 12. In the retracted position, the one or more restraining straps 22 and one or more nets 24 have been automatically moved toward a top of the cargo cabin 12 by the one or more winches 44 against the bias of the one or more spring tension reels 30, thus permitting loading of the cargo C to and from the cargo cabin 12.

Referring to FIG. 12B, the aircraft cargo restraint system 2 is shown with the one or more restraining straps 22 and one or more nets 24 in a deployed position, such that cargo C is restrained by the one or more restraining straps 22 and one or more nets 24. In the deployed position, the one or more restraining straps 22 and one or more nets 24 have been biased towards a bottom of the cargo cabin 12 by the one or more spring tension reels 30 after release of the one or more winches 44. The one or more spring tension reels 30 may provide a force sufficient for locking the one or more restraining straps 22 and one or more nets 24 to the fuselage framework 10, or a separate structure may be employed for locking the one or more restraining straps 22 and one or more nets 24 to the fuselage framework 10. Additionally, as shown, the aircraft cargo restraint system 2 may further include one or more tensioning straps 26 for tensioning the one or more nets 24 around cargo C positioned within the cargo cabin 12.

By restraining the cargo C using the one or more nets 24, the cargo C can be restrained in the vertical, horizontal, and longitudinal directions. Additionally, although FIGS. 12A and 12B include one or more restraining straps 22 and one or more nets 24 coupled to the one or more restraining straps 22, it should be understood that the one or more restraining straps 22 may be omitted, and the one or more nets 24 may be coupled to the one or more spring tension reels 30 and the one or more winches 44.

Figures 13A, 13B:
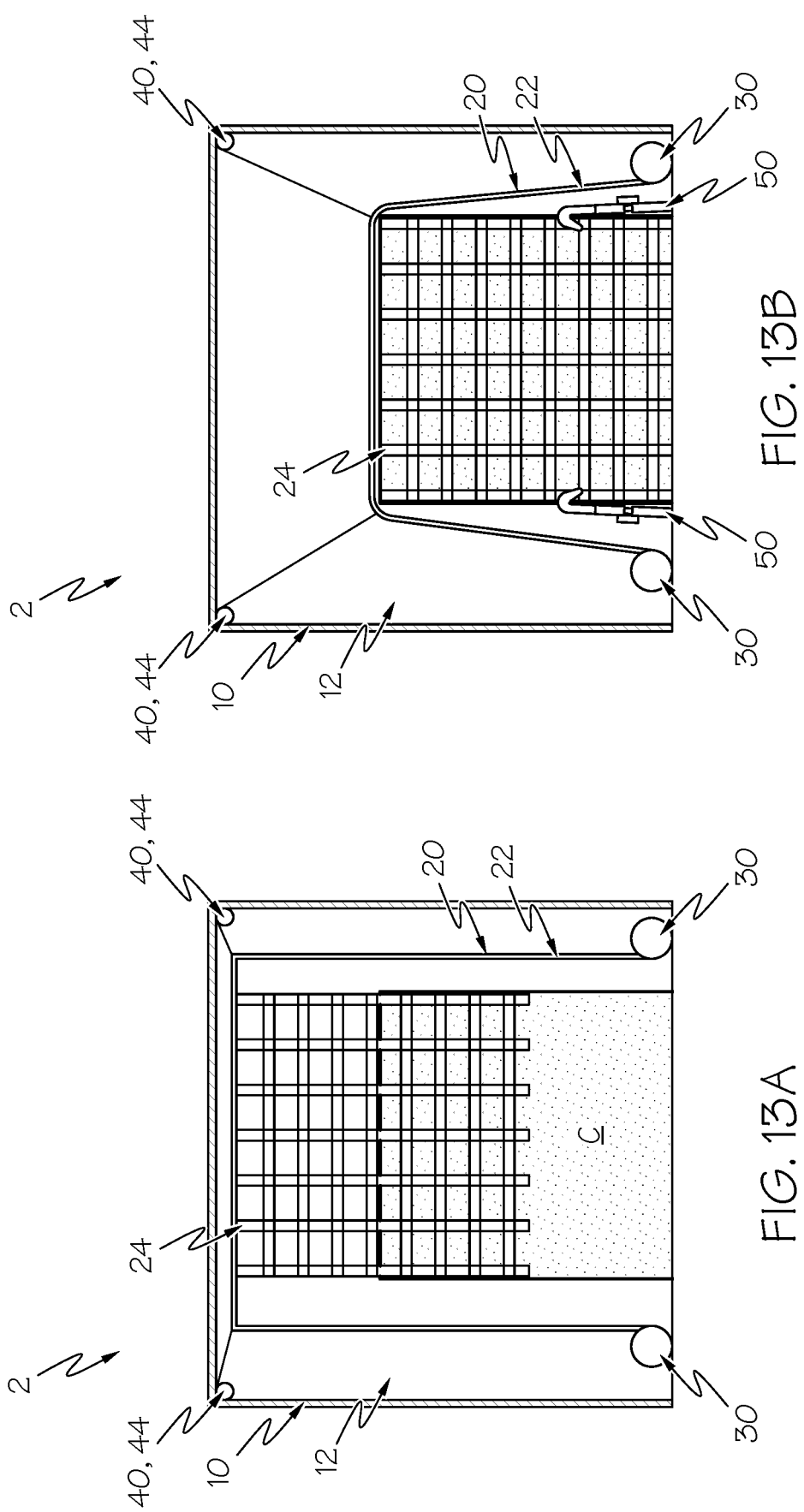
FIG. 13A is a cross-sectional representation of a thirteenth exemplary aircraft cargo restraint system of the present description in a retracted position.
FIG. 13B is a cross-sectional representation of the thirteenth exemplary aircraft cargo restraint system of the present description in a deployed position.

FIG. 13A is a cross-sectional representation of a thirteenth exemplary aircraft cargo restraint system of the present description in a retracted position. FIG. 13B is a cross-sectional representation of the thirteenth exemplary aircraft cargo restraint system of the present description in a deployed position.

As shown in FIGS. 13A and 13B, the aircraft cargo restraint system 2 may additionally include one or more locking hooks 50 for locking the webbing 20, e.g. one or more nets 24, to the fuselage framework 10. The one or more locking hooks 50 may function by hooking onto the one or more nets 24 and pulling towards the fuselage framework 10 to lock the one or more nets 24 to the fuselage framework 10, such as by compression of the one or more locking hooks 50 until the cargo C is locked to the fuselage framework 10. In a non-limiting example, the one or more locking hooks 50 may include one or more reefing hooks. Additionally, as shown, the aircraft cargo restraint system 2 may further include one or more tensioning straps 26 for tensioning the one or more nets 24 around cargo C positioned within the cargo cabin 12.

By locking the cargo C contained with the one or more nets 24 to the fuselage framework 10 using the one or more locking hooks 50, the cargo C can be restrained in the vertical, horizontal, and longitudinal directions. Additionally, although FIGS. 13A and 13B include one or more restraining straps 22 and one or more nets 24 coupled to the one or more restraining straps 22, it should be understood that the one or more restraining straps 22 may be omitted, and the one or more nets 24 may be coupled to the one or more spring tension reels 30 and the one or more winches 44.

FIG. 14A is a cross-sectional representation of a fourteenth exemplary aircraft cargo restraint system of the present description in a retracted position. FIG. 14B is a sectional view along line A-A of FIG. 14A.

As shown in FIGS. 14A and 14B, the aircraft cargo restraint system 2 includes a fuselage framework 10, a moveable carriage 60, a webbing 20, one or more spring tension reels 30, and one or more actuators 40 in the form of one or more actuation straps 42. Although the one or more actuators 40 are shown in the form of one or more actuation straps 42, it is understood that the one or more actuation straps 42 may be actuated by one or more winches 44.

The fuselage framework 10 defines a cargo cabin 12 and includes at least one vertical stanchion 14. The fuselage framework may further include flooring structures 52. The at least one vertical stanchion 14 may take the form of a hollow tube having an interior cavity for passing a line of the one or more spring tension reels 30 and a strap 22 therethrough. As shown in FIG. 10B, the at least one vertical stanchion 14 may further include a stanchion slot 16.

The moveable carriage 60 is coupled to the at least one vertical stanchion 14 and is moveable along the at least one vertical stanchion 14 toward a top and bottom of the cargo cabin 12. The moveable carriage is further coupled, by way of the stanchion slot 16, to the line of the one or more spring tension reels 30 and to the one or more actuation straps 42.

The webbing 20 is configured to restrain cargo C positionable within the cargo cabin 12. The webbing 20 is coupled to the moveable carriage 60. By movement of the moveable carriage 60 toward a top and bottom of the cargo cabin 12, the webbing 20 is moveable to a retracted position at the top of the cargo cabin 12 and to a deployed position at the bottom of the cargo cabin 12.

As shown in FIG. 14A, the one or more spring tension reels 30 are configured to bias the moveable carriage 60 toward a bottom of the cargo cabin 12, and the one or more actuation straps 42 are configured to move the moveable carriage 60 toward a top of the cargo cabin 12 against the bias of the one or more spring tension reels 30. As shown, one or more pulleys 62 may be employed with the one or more actuation straps 42. Thus, control of the movement of the moveable carriage 60, and accordingly the webbing 20, is achieved by the bias of the one or more spring tension reels 30 and actuation of the one or more actuation straps 42.

Figure 15:
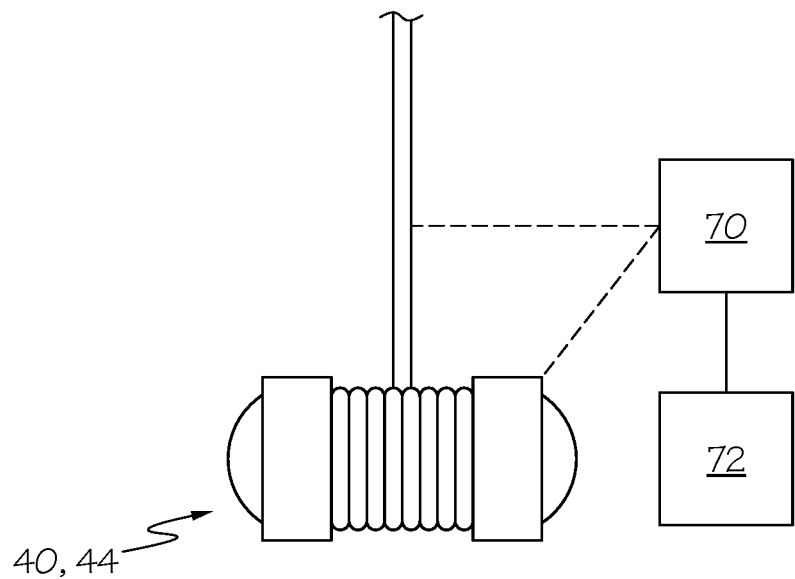
FIG. 15 is schematic representation of a control system according to a feature of the present description.

As shown by FIG. 15, the aircraft cargo restraint system 2 according to any one or more of the above examples may further include one or more pressure sensors 70 configured to detect a load applied by the one or more winches 44, and a controller 72 coupled with the one or more pressure sensors 80 and configured to control the one or more winches 44 to lock the webbing 20 to the fuselage framework 10.

The one or more pressure sensors 70 may include, for example, one or more load sensors coupled to the one or more winches 44 or may include, for example, one or more strain sensors coupled to the webbing 20. Accordingly, the one or more pressure sensors 70 may facilitate determining whether the cargo C is sufficiently restrained or locked to the fuselage framework 10 by the webbing 20.

The controller 72 is a hardware device that controls the one or more winches 44 to lock the webbing 20 to the fuselage framework 10. The controller 72 may be communicatively coupled with the one or more pressure sensors 70. Accordingly, the controller 72 may control the one or more winches 44 based on the detected load applied by the one or more winches 44 such that the controller 72 may ensure cargo C is sufficiently locked to the fuselage framework 10 by the webbing 20. Additionally, by use of the one or more pressure sensors 70 and controller 72, the one or more winches may be auto-stopped when a sufficient forced is applied by the one or more winches.

Figure 16:
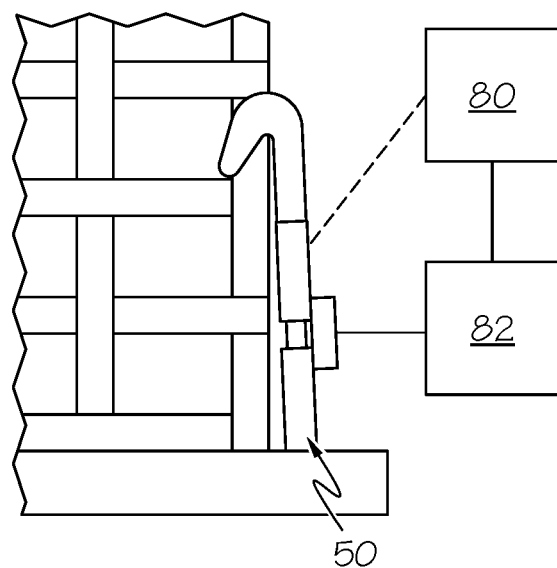
FIG. 16 is schematic representation of a control system according to another feature of the present description.

As shown by FIG. 16, the aircraft cargo restraint system 2 according to any one or more of the above examples may further include one or more pressure sensors 80 configured to detect a load applied by the one or more locking hooks 50, and a controller 82 coupled with the one or more pressure sensors 80 and configured to control the one or more locking hooks 50 to lock the webbing 20 to the fuselage framework 10.

The one or more pressure sensors 80 may include, for example, one or more load sensors coupled to the one or more locking hooks 50 or may include, for example, one or more strain sensors coupled to the webbing 20. Accordingly, the one or more pressure sensors 80 may facilitate determining whether the cargo C is sufficiently locked to the fuselage framework 10 by the webbing 20.

The controller 82 is a hardware device that controls the one or more locking hooks 50 to lock the webbing 20 to the fuselage framework 10. The controller 82 may be communicatively coupled with the one or more pressure sensors 80. Accordingly, the controller 82 may control the one or more locking hooks 50 based on the detected load applied by the one or more locking hooks 50 such that the controller 82 may ensure cargo C is sufficiently locked to the fuselage framework 10 by the webbing 20.

Additionally, by use of the one or more pressure sensors 80 and controller 82, the one or more locking hooks may be self-tightening locking the webbing around the cargo C to the fuselage framework 10.

Figure 17:
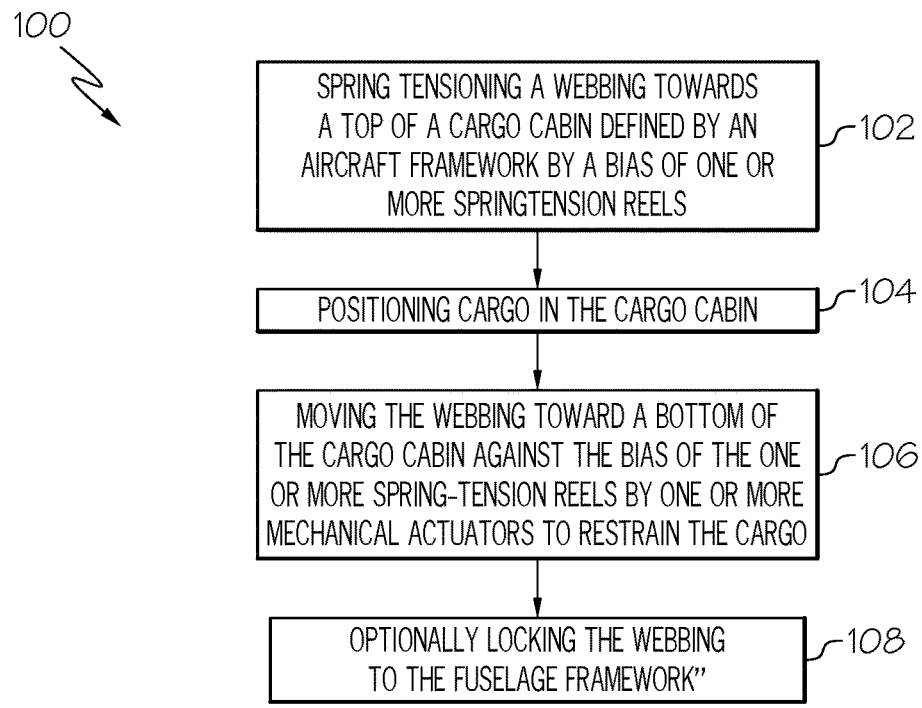
FIG. 17 is a flow diagram representing a first exemplary method for restraining cargo within an aircraft according to the present description.

FIG. 17 is a flow diagram representing a first exemplary method for restraining cargo within an aircraft according to the present description.

As shown by FIG. 17, a method 100 for restraining cargo within an aircraft includes spring tensioning 102 a webbing towards a top of a cargo cabin defined by a fuselage framework by a bias of one or more spring tension reels. This may be accomplished, for example, by any of the first through tenth examples illustrated in FIGS. 1 to 10. However, the method 100 is not limited to the illustrated arrangement of components.

The method 100 further includes positioning 104 cargo in the cargo cabin. The positioning of the cargo in the cargo cabin may be accomplished by any method.

The method 100 further includes moving 106 the webbing toward a bottom of the cargo cabin against the bias of the one or more spring tension reels by one or more actuators to restrain the cargo. This may be accomplished, for example, by any of the first through tenth examples illustrated in FIGS. 1 to 10. However, the method 100 is not limited to the illustrated arrangement of components.

Optionally, the method 100 further includes locking 108 the webbing to the fuselage framework. This may be accomplished, for example, with a force applied by the one or more actuators, or the webbing may otherwise be locked to the fuselage framework, such as by use of locking hooks.

Figure 18:
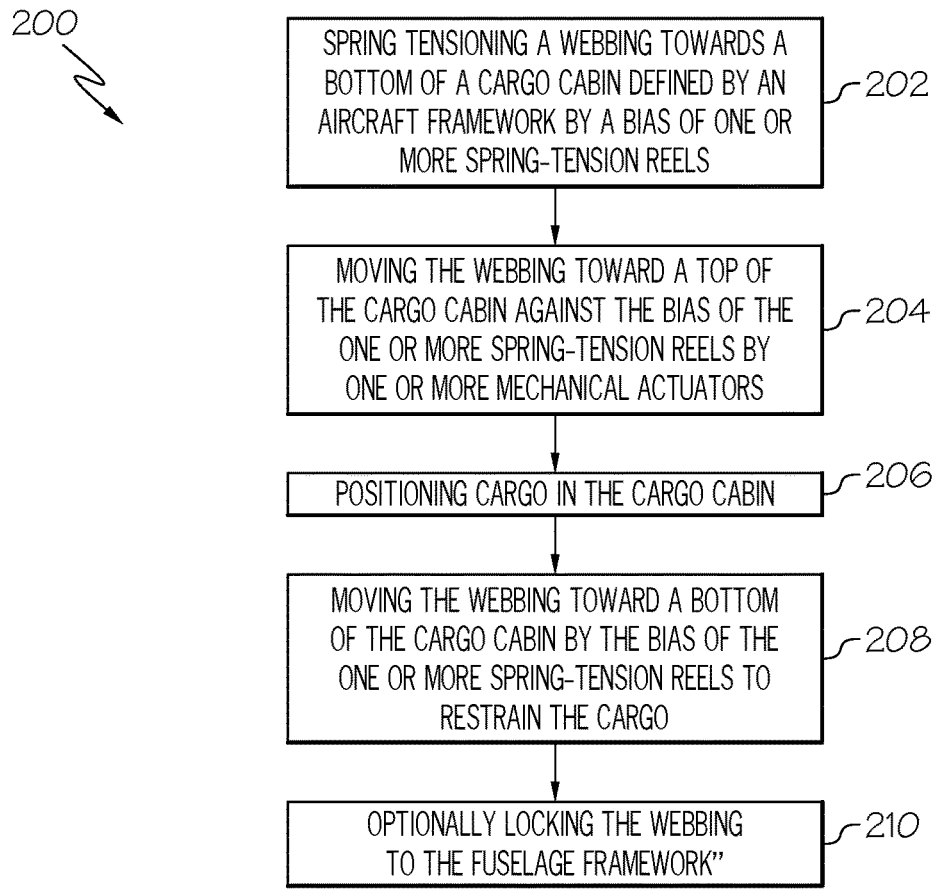
FIG. 18 is a flow diagram representing a second exemplary method for restraining cargo within an aircraft according to the present description.

FIG. 18 is a flow diagram representing a second exemplary method for restraining cargo within an aircraft according to the present description.

As shown by FIG. 18, a method 200 for restraining cargo within an aircraft includes spring tensioning 202 a webbing towards a bottom of a cargo cabin defined by a fuselage framework by a bias of one or more spring tension reels. This may be accomplished, for example, by any of the eleventh through fourteenth examples illustrated in FIGS. 11 to 14. However, the method 200 is not limited to the illustrated arrangement of components.

The method 200 further includes moving 204 the webbing toward a top of the cargo cabin against the bias of the one or more spring tension reels by one or more actuators. This may be accomplished, for example, by any of the eleventh through fourteenth examples illustrated in FIGS. 11 to 14. However, the method 200 is not limited to the illustrated arrangement of components.

The method 200 further includes positioning 206 cargo in the cargo cabin. The positioning of the cargo in the cargo cabin may be accomplished by any method.

The method 200 further includes moving 208 the webbing toward a bottom of the cargo cabin by the bias of the one or more spring tension reels to restrain the cargo. This may be accomplished, for example, by any of the eleventh through fourteenth examples illustrated in FIGS. 11 to 14. However, the method 200 is not limited to the illustrated arrangement of components.

Optionally, the method 200 further includes locking 210 the webbing to the fuselage framework. This may be accomplished, for example, with a force applied by the one or more spring tension reels, or the webbing may otherwise be locked to the fuselage framework, such as by use of locking hooks.

Figure 19:
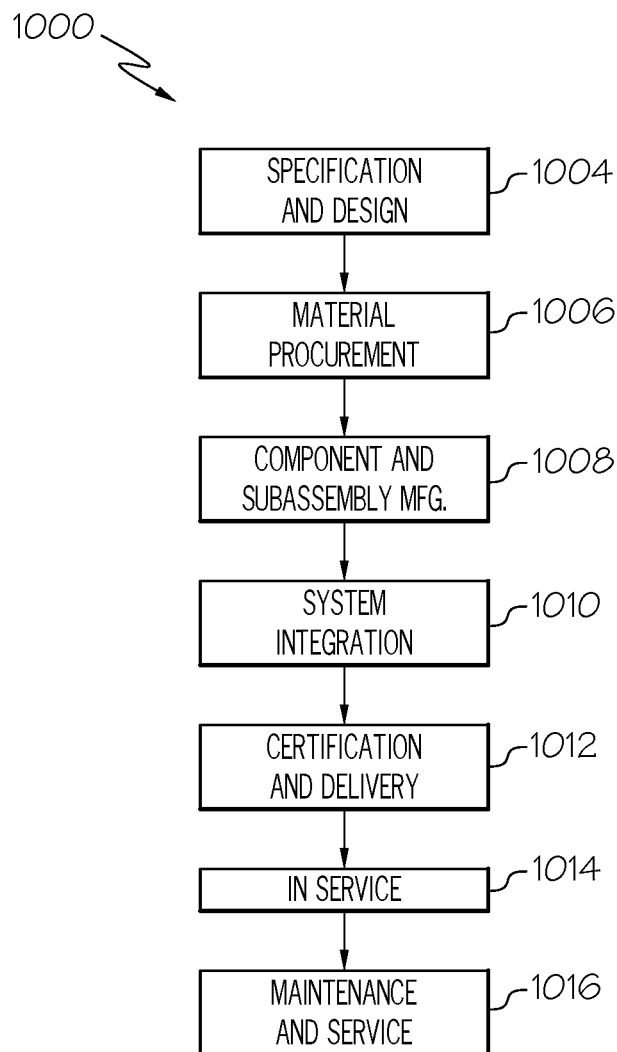
FIG. 19 is a flow diagram of an aircraft manufacturing and service methodology.
Figure 20:
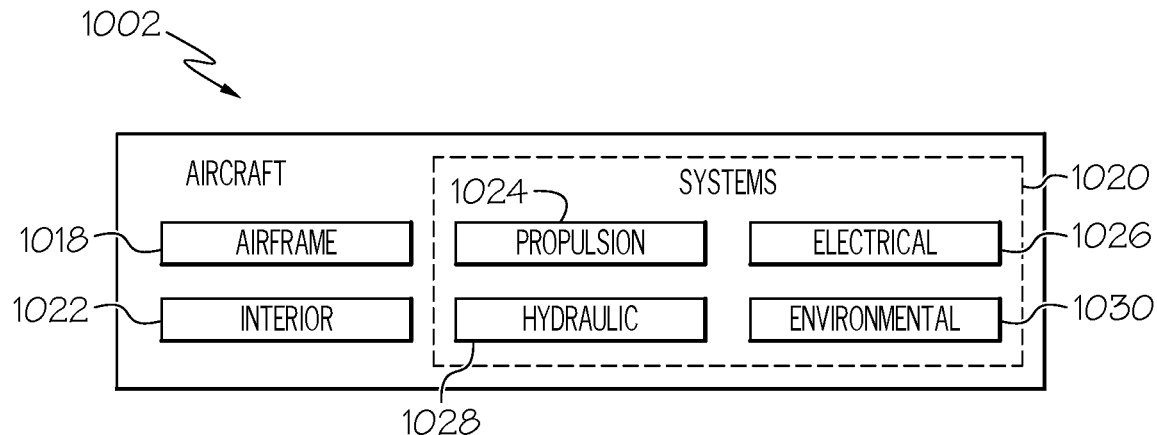
FIG. 20 is a block diagram of an aircraft.

Examples of the present disclosure may be described in the context of an aircraft manufacturing and service method 1000, as shown in FIG. 19, and an aircraft 1002, as shown in FIG. 20. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The methods and systems of the present disclosure may be employed during any one or more of the stages of the aircraft manufacturing and service method 1000, including specification and design 1004 of the aircraft 1002, material procurement 1006, component/subassembly manufacturing 1008, system integration 1010, certification and delivery 1012, placing the aircraft in service 1014, and routine maintenance and service 1016.

As shown in FIG. 19, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included. The methods and systems of the present disclosure may be employed for any of the systems of the aircraft 1002.

Although various embodiments of the disclosed aircraft cargo restraint system and method for restraining cargo within an aircraft have been shown and described, modifications may occur to those skilled in the art upon reading the specification. The present application includes such modifications and is limited only by the scope of the claims.

What is claimed is:

1. An aircraft cargo restraint system comprising:
   a fuselage framework defining a cargo cabin having a top, a bottom opposite the top, a first side between the top and the bottom, and a second side between the top and the bottom, wherein the second side is opposite to the first side;
   a webbing configured to restrain cargo positionable within the cargo cabin;
   a first spring tension reel configured to bias the webbing towards the top and the first side of the cargo cabin;
   a second spring tension reel configured to bias the webbing towards the top and the second side of the cargo cabin; and
   one or more actuators configured to move the webbing toward a bottom of the cargo cabin against the bias of the first and second spring tension reels.

2. The aircraft cargo restraint system of claim 1 wherein the first and second spring tension reels are coupled to the webbing.

3. The aircraft cargo restraint system of claim 1 wherein the one or more actuators include one or more actuation straps for manually moving the webbing toward the bottom of the cargo cabin against the bias of the first and second spring tension reels.

4. The aircraft cargo restraint system of claim 1 wherein the one or more actuators include one or more winches for automatically moving the webbing toward the bottom of the cargo cabin against the bias of the first and second spring tension reels.

5. The aircraft cargo restraint system of claim 4 further comprising:
   one or more pressure sensors configured to detect a load applied by the one or more winches; and
   a controller coupled with the one or more pressure sensors and configured to control the one or more winches to lock the webbing to the fuselage framework.

6. The aircraft cargo restraint system of claim 1 wherein the webbing comprises one or more restraining straps configured to restrain cargo positioned within the cargo cabin.

7. The aircraft cargo restraint system of claim 1 wherein the webbing comprises one or more nets configured to restrain cargo positioned within the cargo cabin.

8. The aircraft cargo restraint system of claim 7 wherein the webbing further comprises one or more tensioning straps for tensioning the one or more nets around cargo positioned within the cargo cabin.

9. The aircraft cargo restraint system of claim 1 further comprising one or more locking hooks for locking the webbing to the fuselage framework.

10. The aircraft cargo restraint system of claim 9 further comprising:
    one or more pressure sensors configured to detect a load applied by the one or more locking hooks; and
    a controller coupled with the one or more pressure sensors and configured to control the one or more locking hooks to lock the webbing to the fuselage framework.

11. An aircraft cargo restraint system comprising:
    a fuselage framework defining a cargo cabin, the fuselage framework including at least one vertical stanchion;
    a moveable carriage coupled to the at least one vertical stanchion;
    a webbing configured to restrain cargo positionable within the cargo cabin, the webbing coupled to the moveable carriage; and
    one or more spring tension reels configured to bias the moveable carriage towards a top of the cargo cabin via a direct connection between the one or more spring tension reels and the moveable carriage; and
    one or more actuators configured to move the moveable carriage toward a bottom of the cargo cabin against the bias of the one or more spring tension reels.

12. The aircraft cargo restraint system of claim 11 wherein the one or more actuators include one or more actuation straps for manually moving the moveable carriage toward a bottom of the cargo cabin against the bias of the one or more spring tension reels.

13. The aircraft cargo restraint system of claim 11 wherein the one or more actuators include one or more winches for automatically moving the moveable carriage toward a bottom of the cargo cabin against the bias of the one or more spring tension reels.

14. The aircraft cargo restraint system of claim 11 wherein the webbing comprises one or more restraining straps configured to restrain cargo positioned within the cargo cabin.

15. The aircraft cargo restraint system of claim 11 wherein the webbing comprises one or more nets configured to restrain cargo positioned within the cargo cabin.

16. The aircraft cargo restraint system of claim 15 wherein the webbing further comprises one or more tensioning straps for tensioning the one or more nets around cargo positioned within the cargo cabin.

17. The aircraft cargo restraint system of claim 11 further comprising one or more locking hooks for locking the webbing to the fuselage framework.

18. The aircraft cargo restraint system of claim 17 further comprising:
- one or more pressure sensors configured to detect a load applied by the one or more locking hooks; and
- a controller coupled with the one or more pressure sensors and configured to control the one or more locking hooks to lock the webbing to the fuselage framework.

19. A method for restraining cargo within an aircraft, the method comprising:
- spring tensioning a webbing towards a top and a first side of a cargo cabin defined by a fuselage framework by a bias of a first spring tension reel;
- spring tensioning the webbing towards a top and a second side of a cargo cabin defined by a fuselage framework by a bias of a second spring tension reel;
- positioning cargo in the cargo cabin; and
- moving the webbing toward a bottom of the cargo cabin against the bias of the first and second spring tension reels by one or more actuators to restrain the cargo.

20. The method of claim 19, further comprising: locking the webbing to the fuselage framework.

* * * * *